(12) United States Patent
Nandeda et al.

(10) Patent No.: US 12,327,209 B1
(45) Date of Patent: *Jun. 10, 2025

(54) SYSTEM AND METHOD OF COGNITIVE RISK MANAGEMENT

(71) Applicant: Blue Yonder Group, Inc., Scottsdale, AZ (US)

(72) Inventors: Narayan Nandeda, Ujjain (IN); Devanand R, Bangalore (IN); Tushar Shekhar, Bengaluru (IN); Vidhi Chugh, Bangalore (IN); Manish Kumar, Bangalore (IN); Deb Mohanty, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,540

(22) Filed: Feb. 3, 2021

Related U.S. Application Data

(60) Provisional application No. 62/970,050, filed on Feb. 4, 2020, provisional application No. 62/969,785, filed on Feb. 4, 2020, provisional application No. 62/969,603, filed on Feb. 3, 2020.

(51) Int. Cl.
| | |
|---|---|
| *G06Q 10/0635* | (2023.01) |
| *G06N 7/01* | (2023.01) |
| *G06Q 10/0639* | (2023.01) |
| *G06Q 10/087* | (2023.01) |

(52) U.S. Cl.
CPC ........... *G06Q 10/0635* (2013.01); *G06N 7/01* (2023.01); *G06Q 10/06393* (2013.01); *G06Q 10/087* (2013.01)

(58) Field of Classification Search
CPC .......... G06Q 10/087; G06Q 10/06393; G06Q 10/0635; G06N 7/01
See application file for complete search history.

(56) References Cited

U.S. PATENT DOCUMENTS

| | | | |
|---|---|---|---|
| 2007/0100724 A1* | 5/2007 | Hollas ................ | G06Q 10/0635 705/36 R |
| 2015/0331596 A1* | 11/2015 | Yu ........................ | G06F 16/2428 715/762 |
| 2015/0378743 A1* | 12/2015 | Zellermayer ....... | G06F 9/45558 713/2 |
| 2016/0063419 A1* | 3/2016 | Martinez .............. | G06Q 10/063 705/7.25 |
| 2016/0173584 A1* | 6/2016 | Fitzpatrick .......... | H04L 67/1008 709/223 |

(Continued)

*Primary Examiner* — Deirdre D Hatcher
(74) *Attorney, Agent, or Firm* — Spencer Fane LLP; Steven J. Laureanti

(57) ABSTRACT

A system and method for a risk management visualization system comprises a computer having a processor and memory and configured to model a supply chain network as a supply chain planning problem, one or more key process indicators (KPIs) of the supply chain planning problem is based, at least in part, on the one or more input variables, model an impact on the one or more KPIs from each of the one or more input variables at a selected confidence interval using a Bayesian optimization process, and display a visualization of a risk profile for the one or more KPIs, the visualization indicating a probability that an actual KPI value differs from a predicted KPI value.

20 Claims, 17 Drawing Sheets

(56) References Cited

U.S. PATENT DOCUMENTS

| | | | |
|---|---|---|---|
| 2016/0217399 A1* | 7/2016 | Roelofs | G06Q 10/063116 |
| 2020/0050966 A1* | 2/2020 | Enuka | G06K 9/6267 |
| 2020/0143313 A1* | 5/2020 | Ohlsson | G06N 7/005 |
| 2021/0319363 A1* | 10/2021 | Gillberg | G06V 10/774 |

* cited by examiner

| | 1404a | 1404b | 1404c | 1404d |
|---|---|---|---|---|
| KPI Summary | Network Profit | Overhead Cost | Transportation Cost | Transit Inv. Cost |
| Current Run | 1041310 | 345002 | 54277 | 79544 |
| Previous Run | 1041310 | 392502 | 59877 | 31542 |

SYSTEM AND METHOD OF COGNITIVE RISK MANAGEMENT

CROSS-REFERENCE TO RELATED APPLICATIONS

The present disclosure is related to that disclosed in the U.S. Provisional Application No. 62/970,050, filed Feb. 4, 2020, entitled "System and Method of Cognitive Risk Management," U.S. Provisional Application No. 62/969,785, filed Feb. 4, 2020, entitled "System and Method of Cognitive Risk Management Visualization," and U.S. Provisional Application No. 62/969,603, filed Feb. 3, 2020, entitled "System and Method of Cognitive Risk Management." U.S. Provisional Application Nos. 62/970,050, 62/969,785, and 62/969,603 are assigned to the assignee of the present application. The subject matter disclosed in U.S. Provisional Application Nos. 62/970,050, 62/969,785, and 62/969,603 are hereby incorporated by reference into the present disclosure as if fully set forth herein. The present invention hereby claims priority under 35 U.S.C. § 119(e) to U.S. Provisional Application Nos. 62/970,050, 62/969,785, and 62/969,603.

TECHNICAL FIELD

The present disclosure relates generally to supply chain planning and specifically to managing risk due to input variability.

BACKGROUND

During supply chain planning, a supply chain plan may be generated that maximizes or minimizes a business objective given the value or a range of values for one or more of the input variables. When the business objective is maximizing or minimizing the value of a key process indicator (KPI), the solution provides the optimal KPI for the given values for selected input variables. To help in determining risk in supply chain planning, the system is often unable to present a large amount of data and further is unable to present this data with regard to individual tolerances for risk. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
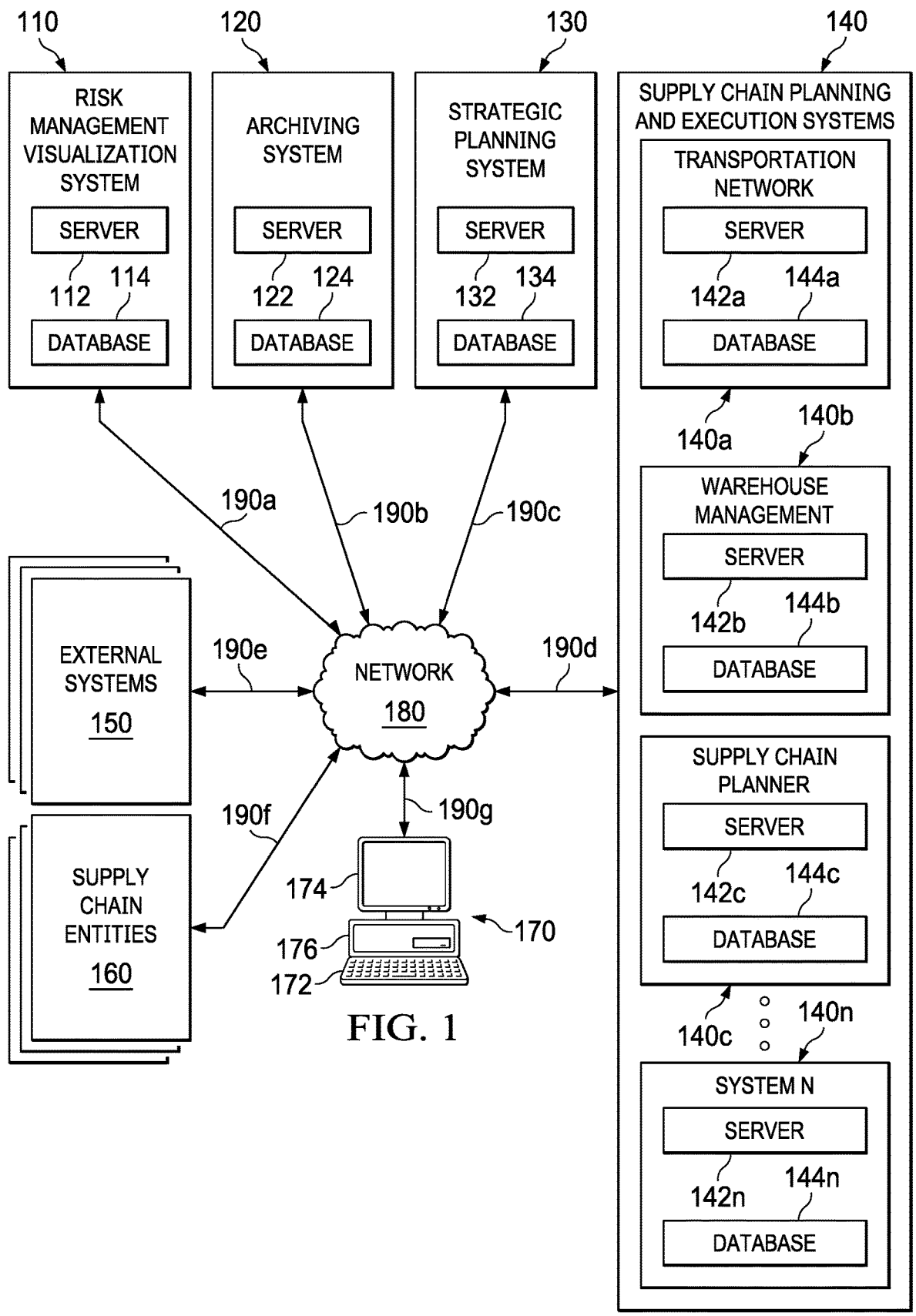
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, according to a first embodiment. Supply chain network 100 comprises risk management visualization system 110, archiving system 120, strategic planning system 130, one or more planning and execution systems 140, one or more external systems 150, one or more supply chain entities 160, one or more computers 170, network 180, and one or more communication links 190a-190g. Although a single risk management visualization system 110, a single archiving system 120, a single strategic planning system 130, one or more planning and execution systems 140, one or more external systems 150, one or more supply chain entities 160, one or more computers 170, and a single network 170 are shown and described, embodiments contemplate any number of risk management visualization systems, archiving systems, strategic planning systems, supply chain planning and execution systems, external systems, supply chain entities, computers, or networks, according to particular needs.

In one embodiment, risk management visualization system 110 comprises server 112 and database 114. Server 112 comprises one or more modules that generate a risk profile for predicted Key Process Indicators (KPIs) of a supply chain plan based, at least in part, on the uncertainty of one or more input variables and a user-selectable amount of acceptable risk. Risk management visualization system 110 comprises a graphical user interface (GUI) that displays visualizations of the risk profile for at least one KPI while also providing interactive visual elements that provide for user selection or adjustment of input variable values and an acceptable risk range. In response to one or more selections or adjustments, risk management visualization system 110 may recalculate and display an updated risk profile, which may include visualizations showing whether the selections or adjustments resulted in reducing or increasing the risk. As described in further detail below, embodiments of risk management visualization system 110 comprise a tool to identify the inputs having the greatest influence on one or more KPIs and sort these inputs according to the degree of their influence, variability, and risk likelihood. In one embodiment, risk management visualization system 110 calculates, for the input variables, an optimal value that maximizes or minimizes the KPI as well as a range of feasible values that fall within an acceptable risk range.

Archiving system 120 of supply chain network 100 comprises server 122 and database 124. Although archiving system 120 is shown as comprising a single server 122 and a single database 124, embodiments contemplate any suitable number of servers or databases internal to, or externally coupled with, archiving system 120. Server 122 of archiving system 120 supports one or more processes for receiving and storing data from strategic planning system 130, one or more planning and execution systems 140, one or more external systems 150, one or more supply chain entities 160, and/or one or more computers 170 of supply chain network 100. According to some embodiments, archiving system 120 provides archived data to risk management visualization system 110, strategic planning system 130, and one or more planning and execution systems 140 to, for example, model and calculate the input variability, create machine learning models of the KPI response to the input variability using a Bayesian optimization process, and generate plans or solutions having a user-adjustable amount of risk. Server 122 may store the received data in database 124. Database 124 of archiving system 120 may comprise one or more databases or other data storage arrangement at one or more locations, local to, or remote from, server 122.

Strategic planning system 130 of supply chain network 100 comprises server 132 and database 134. Server 132 of strategic planning system 130 provides for modeling and planning supply chain networks, what-if scenarios, and solving supply chain planning problems to analyze, optimize, and design supply chain network 100. In one embodiment, strategic planning system 130 aligns one or more planning and execution systems 140 to a supply chain plan to improve, for example, profit, service level, revenue, growth, and the like while respecting costs, constraints, and business objectives. As described in further detail below, strategic planning system 130 models supply chain planning problems, supply chain networks, what-if scenarios as mathematical formulations. In addition, or as an alternative, strategic planning system 130 solves one or more models of supply chain planning problems, supply chain networks, what-if scenarios as mathematical formulations to generate a solution.

In one embodiment, a solution comprises the maximum or minimum value of a business objective given the value (or a range of values) for one or more input variables. When the business objective is maximizing or minimizing the value of a KPI, the solution provides the optimal KPI for the given values for selected input variables. One or more solvers 264 (FIG. 2) process complex supply chain planning problems and models wherein a correlation between input and output is non-trivial. As described in further detail below, risk management visualization system 110 provides a dynamic dashboard that visualizes the risk and probabilistic nature of inputs and predictions of global optimizers for plans with these complex constraints. As described in further detail below, risk management dashboard 600 (FIGS. 6A-6B) provides for determining, among other things, the predicted value of the KPI, the likelihood that a KPI value dips by a particular value or percentage, the range of input values that are expected to give a KPI value within an acceptable level of risk, and the most likely value of a KPI for a particular confidence level. Although examples of risk management visualization system 110 disclosed herein are given in connection with strategic planning system 130, embodiments contemplate risk management visualization system 110 operably coupled with any one or more planning and execution systems 140 of supply chain network 100, according to particular needs.

One or more planning and execution systems 140 of supply chain network 100 comprise transportation network 140a, warehouse management system 140b, supply chain planner 140c, and any other planning and execution system 140n. Although one or more planning and execution systems 140 are shown and described as comprising a single transportation network 140a, a single warehouse management system 140b, a single supply chain planner 140c, and a single other planning and execution system 140n, embodiments contemplate any number or combination of one or more planning and execution systems 140 located internal to, or remote from, supply chain network 100, according to particular needs. For example, planning and execution systems 140 typically perform several distinct and dissimilar processes, including, for example, assortment planning, demand planning, operations planning, production planning, supply planning, distribution planning, execution, forecasting, transportation management, warehouse management, inventory management, fulfilment, procurement, and the like. Server 142 of one or more planning and execution systems 140 comprises one or more modules, such as, for example, a planning module, a solver, a modeler, and/or an engine, for performing activities of one or more planning and execution processes. Server 142 stores and retrieves data from database 144 or from one or more locations in supply chain network 100. In addition, one or more planning and execution systems 140 operate on one or more computers 170 that are integral to, or separate from, the hardware and/or software that support risk management visualization system 110, archiving system 120, strategic planning system 130, one or more external systems 150, or one or more supply chain entities 160.

By way of example only and not by way of limitation, one or more planning and execution systems 140 include transportation network 140a. Transportation network 140a comprises server 142a and database 144a. According to embodiments, transportation network 140a directs one or more transportation vehicles to ship one or more items between one or more supply chain entities 160, based, at least in part, on a supply chain plan, including a supply chain master plan, the number of items currently in stock at one or more supply chain entities 160 or other stocking location, the number of items currently in transit in transportation network 140a, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with risk management visualization system 110, archiving system 120, strategic planning system 130, one or more planning and execution systems 140, one or more external systems 150, and/or one or more supply chain entities 160 to identify the location of the one or more transportation vehicles and the location of any inventory or shipment located on the one or more transportation vehicles.

By way of a further example only and not by way of limitation, one or more planning and execution systems 140 include warehouse management system 140*b*. Server 142*b* stores and retrieves item data from database 144*b* or from one or more locations in supply chain network 100. According to embodiments, server 142*b* comprises one or more modules that manage and operate warehouse operations, plan timing and identity of shipments, generate picklists, packing plans, and instructions. Warehouse management system 140*b* instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 140*b* determining routing, packing, or placement of any item, package, or container into any packing area, including, packing any item, package, or container in another item, package, or container. Warehouse management system 140*b* may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like. Although one or more planning and execution systems 140 are shown and described as comprising warehouse management system 140*b*, embodiments contemplate one or more planning and execution systems 140 including or working in connection with an inventory system. A server of the inventory system is configured to receive and transmit item data, including item identifiers, pricing data, attribute data, inventory levels, and other like data about one or more items at one or more stocking locations in supply chain network 100.

As disclosed above, one or more planning and execution systems 140 may include supply chain planner 140*c*. Server 142*c* stores and retrieves item data from database 144*c* or from one or more locations in supply chain network 100. According to embodiments, supply chain planner 140*c* solves supply chain planning problems (such as, for example, operation planning problems) and generates a solution to a supply chain planning problem, wherein the solution comprises the maximum or minimum value of a KPI (for maximization KPIs, such as, for example, network profit and for minimization KPIs, such as, for example, cost). Planning and execution systems 140 may transmit solution output to risk management visualization system 110, which calculates and visualizes a risk profile based on the received data.

One or more external systems 150 comprise server 152 and database 154. One or more external systems 150 may comprise a repository or interface that provides for example, weather data, special events data, social media data, calendars, and the like and stores the received data in database 154.

As shown in FIG. 1, supply chain network 100 comprising risk management visualization system 110, archiving system 120, strategic planning system 130, one or more planning and execution systems 140, one or more external systems 150, and one or more supply chain entities 160 may operate on one or more computers 170 that are integral to or separate from the hardware and/or software that support risk management visualization system 110, archiving system 120, strategic planning system 130, one or more planning and execution systems 140, one or more external systems 150, and one or more supply chain entities 160. One or more computers 170 may include any suitable input device 172, such as a keypad, mouse, touch screen, microphone, or other device to input information. Output device 174 may convey information associated with the operation of supply chain network 100, including digital or analog data, visual information, or audio information. A computer may include fixed or removable computer-readable storage media, including a non-transitory computer readable medium, magnetic computer disks, flash drives, CD-ROM, in-memory device or other suitable media to receive output from and provide input to the supply chain network. One or more computers 170 may include one or more processors 176 and associated memory to execute instructions and manipulate information according to the operation of virtual persona system 100 and any of the methods described herein. In addition, or as an alternative, embodiments contemplate executing the instructions on one or more computers that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

According to embodiments, one or more computers 170 comprise one or more networked communication devices comprising one or more sensors. The one or more sensors of the one or more networked communication devices may comprise an imaging sensor, such as, a camera, scanner, electronic eye, photodiode, charged coupled device (CCD), or any other electronic component that detects visual characteristics (such as color, shape, size, fill level, or the like) of objects. The one or more networked communication devices may comprise, for example, a mobile handheld electronic device such as, for example, a smartphone, a tablet computer, a wireless communication device, and/or one or more networked communication devices configured to image items using the one or more sensors and transmit product images to one or more databases. In addition, or as an alternative, the one or more sensors may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. The one or more networked communication devices may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner.

In addition, the one or more sensors of the one or more networked communication devices may be located at one or more locations local to, or remote from, the one or more networked communication devices, including, for example, the one or more sensors integrated into the one or more networked communication devices or the one or more sensors remotely located from, but communicatively coupled with, the one or more networked communication devices. According to some embodiments, the one or more sensors of networked communication devices may be configured to communicate directly or indirectly with one or more of risk management visualization system 110, archiving system 120, strategic planning system 130, one or more planning and execution systems 140, one or more external systems 150, one or more supply chain entities 160, one or more computers 170, and/or network 180 using one or more communication links 190a-190g.

Risk management visualization system 110, archiving system 120, strategic planning system 130, one or more planning and execution systems 140, one or more external systems 150, and one or more supply chain entities 160 may each operate on one or more separate computers 170, a network of one or more separate or collective computers 170, or may operate on one or more shared computers 170. In addition, supply chain network 100 may comprise a cloud-based computing system having processing and storage devices at one or more locations, local to, or remote from risk management visualization system 110, archiving system 120, strategic planning system 130, one or more planning and execution systems 140, one or more external systems 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device.

In an embodiment, one or more users may be associated with risk management visualization system 110, archiving system 120, strategic planning system 130, one or more planning and execution systems 140, one or more external systems 150, and one or more supply chain entities 160. These one or more users may include, for example, a "manager" or a "planner" handling supply chain planning, configuration and operation of risk management visualization system 110, designing and optimization of supply chain network 100, and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 160 may represent one or more suppliers, manufacturers, distribution centers, and retailers in one or more supply chain networks, including one or more enterprises. One or more suppliers may be any suitable entity that offers to sell or otherwise provides one or more components to one or more manufacturers. One or more suppliers may, for example, receive a product from a first supply chain entity in supply chain network 100 and provide the product to another supply chain entity. One or more suppliers may comprise automated distribution systems that automatically transport products to one or more manufacturers based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport to one or more retailers or customers and/or automatically remove an item from, or place an item into, inventory based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are shown and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity. Although one example of a supply chain network is shown and described, embodiments contemplate any configuration of supply chain network 100, without departing from the scope of the present disclosure.

In one embodiment, risk management visualization system 110 may be coupled with network 180 using communication link 190a, which may be any wireline, wireless, or other link suitable to support data communications between risk management visualization system 110 and network 180 during operation of supply chain network 100. Archiving system 120 may be coupled with network 180 using communication link 190b, which may be any wireline, wireless, or other link suitable to support data communications between archiving system 120 and network 180 during operation of supply chain network 100. Strategic planning system 130 may be coupled with network 180 using communication link 190c, which may be any wireline, wireless, or other link suitable to support data communications between strategic planning system 130 and network 180 during operation of supply chain network 100. The one or more planning and execution systems 140 may be coupled with network 180 using communication link 190d, which may be any wireline, wireless, or other link suitable to support data communications between one or more planning and execution systems 140 and network 180 during operation of supply chain network 100. One or more external systems 150 are coupled with network 180 using communication link 190e, which may be any wireline, wireless, or other link suitable to support data communications between one or more external systems 150 and network 180 during operation of supply chain network 100. One or more supply chain entities 160 may be coupled with network 180 using communication link 190f, which may be any wireline, wireless, or other link suitable to support data communications between one or more supply chain entities 160 and network 180 during operation of supply chain network 100. One or more computers 170 may be coupled with network 180 using communication link 190g, which may be any wireline, wireless, or other link suitable to support data communications between one or more computers 170 and network 180 during operation of supply chain network 100.

Although one or more communication links 190a-190g are shown as generally coupling risk management visualization system 110, archiving system 120, strategic planning system 130, one or more planning and execution systems 140, one or more external systems 150, one or more supply chain entities 160, and one or more computers 170 to network 180, each of risk management visualization system 110, archiving system 120, strategic planning system 130, one or more planning and execution systems 140, one or more external systems 150, one or more supply chain entities 160, and one or more computers 170 may communicate directly with each other, according to particular needs.

In another embodiment, network 180 includes the Internet and any appropriate local area networks (LANs), metropolitan area networks (MANs), or wide area networks (WANs) coupling risk management visualization system 110, archiving system 120, strategic planning system 130, one or more planning and execution systems 140, one or more external systems 150, one or more supply chain entities 160, and one or more computers 170. For example, data may be maintained by locally to, or externally of, risk management visualization system 110, archiving system 120, strategic planning system 130, one or more planning and execution systems 140, one or more external systems 150, one or more supply chain entities 160, and one or more computers 170 and made available to one or more associated users of risk management visualization system 110, archiving system 120, strategic planning system 130, one or more planning and execution systems 140, one or more external systems 150, one or more supply chain entities 160, and one or more computers 170 using a network or in any other appropriate manner. Those skilled in the art will recognize that the complete structure and operation of a network and other components within supply chain network 100 are not depicted or described. Embodiments may be employed in conjunction with known communications networks and other components.

According to the principles of embodiments described herein, strategic supply chain planner 130 and/or one or more planning and execution systems 140 may generate a supply chain plan. Furthermore, one or more computers 170 associated with strategic supply chain planner 130 and/or one or more planning and execution systems 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein. For example, the methods described herein may include one or more computers 170 receiving product data from automated machinery having at least one sensor and the product data corresponding to an item detected by the automated machinery. The received product data may include an image of the item, an identifier, as described above, and/or product information associated with the item, including, for example, dimensions, texture, estimated weight, and the like. One or more computers 170 may also receive, from the one or more sensors of one or more external systems 150, a current location of the identified item.

The methods may further include one or more computers 170 looking up the received product data one or more databases to identify the item corresponding to the product data received from automated machinery. Based on the identification of the item, one or more computers 170 may also identify (or alternatively generate) a first mapping the database system, where the first mapping is associated with the current location of the identified item. One or more computers 170 may also identify a second mapping in the database system, where the second mapping is associated with a past location of the identified item. One or more computers 170 may also compare the first mapping and the second mapping to determine if the current location of the identified item in the first mapping is different than the past location of the identified item in the second mapping. One or more computers 170 may send instructions to the automated machinery based, at least in part, on one or more differences between the first mapping and the second mapping such as, for example, to locate items to add to or remove from an inventory of or shipment for one or more supply chain entities 160. In addition, or as an alternative, strategic supply chain planner 130 and/or one or more planning and execution systems 140 monitors one or more supply chain constraints of one or more items at one or more supply chain entities 160 and adjusts the orders and/or inventory of one or more supply chain entities 160 at least partially based on one or more supply chain constraints.

Figure 2:
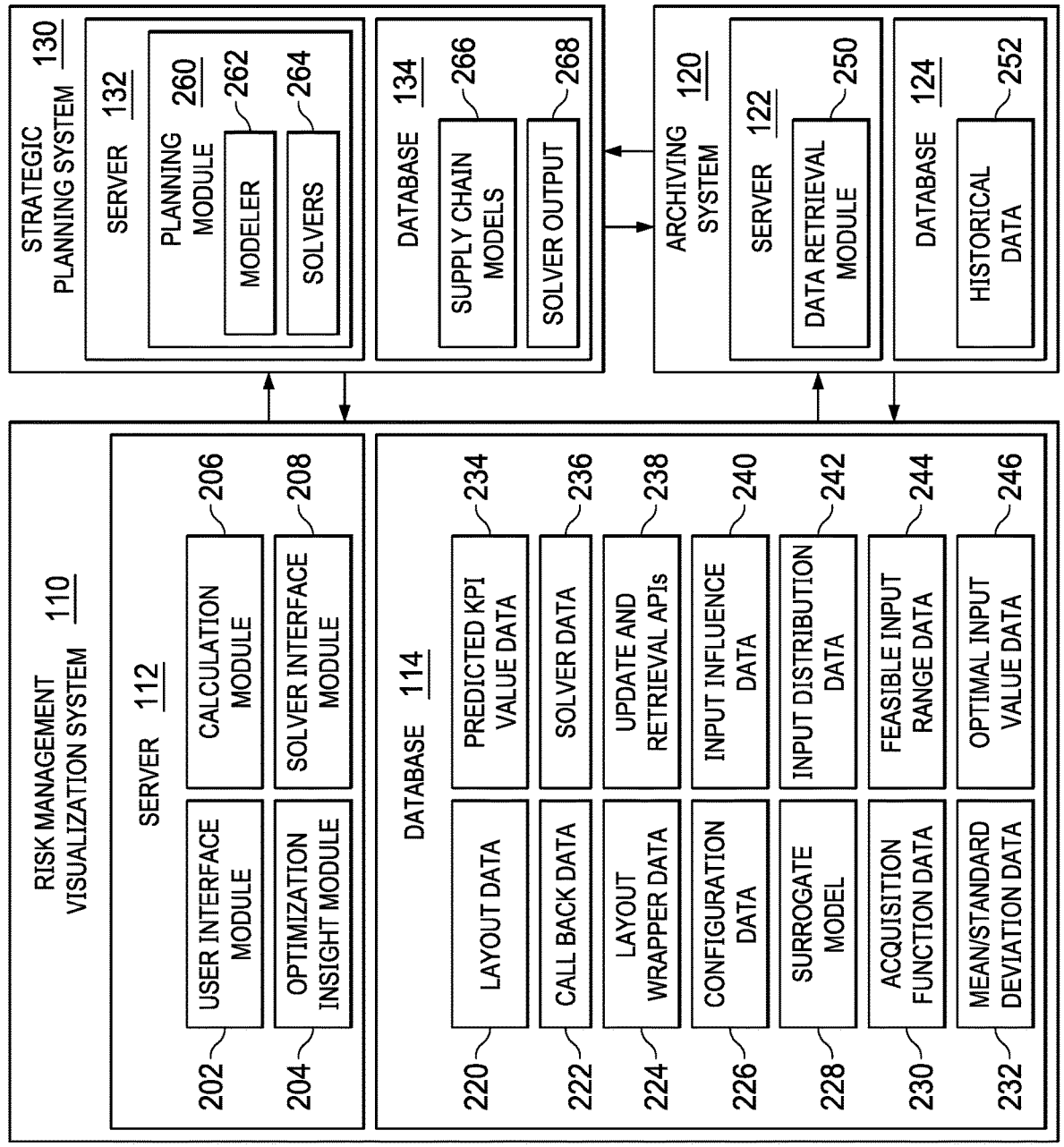
FIG. 2 illustrates the risk management visualization system, the archiving system, and the strategic planning system of FIG. 1 in greater detail, according to an embodiment.

FIG. 2 illustrates risk management visualization system 110, archiving system 120, and strategic planning system 130 of FIG. 1 in greater detail, according to an embodiment. Risk management visualization system 110 comprises server 112 and database 114, as discussed above. Although risk management visualization system 110 is shown as comprising a single server 112 and a single database 114, embodiments contemplate any suitable number of servers or databases internal to or externally coupled with risk management visualization system 110.

Server 112 of risk management visualization system 110 comprises user interface module 202, optimization insight module 204, calculation module 206, and solver interface module 208. Although server 112 is shown and described as comprising a single user interface module 202, a single optimization insight module 204, a single calculation module 206, and a single solver interface module 208, embodiments contemplate any suitable number or combination of these located at one or more locations local to, or remote from, risk management visualization system 110, such as on multiple servers or computers at one or more locations in supply chain network 100.

Database 114 of risk management visualization system 110 may comprise one or more databases or other data storage arrangement at one or more locations, local to, or remote from, server 112. Database 114 of risk management visualization system 110 comprises, for example, layout data 220, call back data 222, layout wrapper data 224, configuration data 226, surrogate model 228, acquisition function data 230, mean and standard deviation data 232, predicted KPI value data 234, solver data 236, update and retrieval Application Programming Interfaces (APIs) 238, input influence data 240, input distribution data 242, feasible input range data 244, and optimal input data 246. Although database 114 of risk management visualization system 110 is shown and described as comprising layout data 220, call back data 222, layout wrapper data 224, configuration data 226, surrogate model 228, acquisition function data 230, mean and standard deviation data 232, predicted KPI value data 234, solver data 236, update and retrieval Application Programming Interfaces (APIs) 238, input influence data 240, input distribution data 242, feasible input range data 244, and optimal input data 246, embodiments contemplate any suitable number or combination of these, located at one or more locations local to, or remote from, risk management visualization system 110 according to particular needs.

User interface (UI) module 202 of risk management visualization system 110 generates and displays a UI, such as, for example, a GUI, that displays risk profile visualizations on risk management dashboard 600. According to embodiments, UI module 202 comprises a GUI displaying interactive elements on risk management dashboard 600 for modifying or selecting one or more KPIs, input values, and upper and lower bounds of a risk range. Optimization insight module 204 of risk management visualization system 110 generates one or more KPI risk profiles, including retrieving and updating data for the visualizations displayed by UI module 202. According to embodiments, optimization insight module 204 runs calculation processes for displayed metrics of the visualization dashboard. According to embodiments where the mean and standard deviation are known, optimization insight module 204 models the data according to one or more distribution patterns such as, for example, Gaussian distribution, Beta and Gamma distribution, and the like. In other embodiments, calculation module 206 receives historical data 252 from archiving system 120 and calculates the mean and standard deviation for one or more input values.

In addition or as an alternative, optimization insight module 204 utilizes calculation module 206 to calculate predictions of the KPIs for all possible combinations of inputs using surrogate model 228 from the Bayesian 'black box' optimization process. In one embodiment, calculation module 206 performs fitting of Gaussian processes using the Bayesian black box optimization process. As described herein, calculation module 206 builds surrogate model 228 predictions using Gaussian processes to fit a limited number of data points that are calculated by one or more solvers 264 of strategic planning system 130.

Solver interface module 208 comprises a system interface that receives calculated KPI values from one or more solvers 264 of strategic planning system 130 for one or more sample input values. The sample input values and the calculated KPI values comprise data points used by calculation module 206 to fit surrogate model 228. In one embodiment, solver interface module 208 comprises sends calls to one or more solvers 264 of strategic planning system 130 and receives responses from one or more solvers 264 in JavaScript Object Notation (JSON), or any other suitable format. Although solver interface module 208 is shown and described as transmitting sample input values to one or more solvers 264 of strategic planning system 130 and receiving the calculated KPI values, embodiments contemplate solver interface module 208 communicating with one or more solvers of any one or more planning and execution systems 140 of supply chain network 100 to calculate KPIs based on any suitable inputs, according to particular needs.

The various types of data stored in database 114 of risk management visualization system 110 will now be discussed.

Layout data 220 stored in database 114 comprises one or more layout configurations arranged according to an index. The index configures the display and source of the visualizations and interactive elements displayed by risk management dashboard 600. UI module 202 uses one or more call back scripts (call back data 222) to transmit requests to solver interface module 208, process solver output 268 received from one or more solvers 264, and update one or more visualizations of risk management dashboard 600 according to the processed solver output 268. Layout wrapper 224 comprises a python module that prepares UI component values. When launching risk management dashboard 600, UI module 202 accesses configuration data 226 describing the inputs and KPIs that are displayed on risk management dashboard 600. For a different dashboard, configuration data 226 may specify a different KPI and different inputs. As disclosed above, risk management visualization system 110 retrieves the mean and standard deviation from mean and standard deviation data 232 for the input variables in configuration data 226. Calculation module 206 builds surrogate model 228 by approximating the relationship between a single input value and a resulting KPI. To find better sample points for building surrogate model 228, calculation module 206 uses acquisition function stored in acquisition function data 230 to find inputs with high uncertainties and inputs with high derivative values.

Update and retrieval APIs 238 comprise code used by solver interface module 208 to communicate with one or more solvers 268 of strategic planning system 130. In addition, or as an alternative, update and retrieval APIs 138 update and/or retrieve data from one or more of archiving system 120, strategic planning system 130, one or more planning and execution systems 140, one or more external systems 150 and one or more supply chain entities 160, according to particular needs.

Risk management visualization system 110 calculates input influence stored as input influence data 240 for one or more KPI values. To determine input influence, risk management visualization system 110 calculates and displays input distributions stored as input distributions data 242, feasible input range stored as feasible input range data 244, and an optimal input value stored as optimal input value data 246, as disclosed in further detail below. According to embodiments, input distributions comprise a range of values for the inputs and the probability of their occurrence. Feasible input range comprises the values of the inputs that produce a KPI that is within a selected risk range of the predicted optimal KPI. Optimal input value comprises a value of the input variable predicted to give the optimal KPI (e.g. a maximum value of a KPI (for a maximization function) or a minimum value of a KPI (for a minimization function)).

As disclosed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 250. Although server 122 is shown and described as comprising a single data retrieval module 250, embodiments contemplate any suitable number or combination of data retrieval modules located at one or more locations, local to, or remote from archiving system 120, such as on multiple servers or computers at one or more locations in supply chain network 100.

Database 124 of archiving system 120 may comprise one or more databases or other data storage arrangement at one or more locations, local to, or remote from, server 122. Database 124 of archiving system 120 comprises, for example, historical data 252. Although database 124 of archiving system 120 is shown and described as comprising historical data 252, embodiments contemplate any suitable number or combination of data, located at one or more locations, local to, or remote from, archiving system 120, according to particular needs.

In one embodiment, data retrieval module 250 of archiving system 120 receives historical data 252 from one or more planning and execution systems 140 and one or more supply chain entities 160 and stores the received historical data 252 in database 124. According to one embodiment, data retrieval module 250 may prepare historical data 252 for use by risk management visualization system 110, strategic planning system 130, and/or one or more planning and execution systems 140 by checking historical data 252 for errors and transforming historical data 252 to normalize, aggregate, and/or rescale historical data 252 to allow direct comparison of data received from different planning and execution systems 140 and one or more supply chain entities 160 at one or more other locations local to, or remote from, archiving system 120. According to embodiments, data retrieval module 250 receives data from one or more external systems 150, such as, for example, weather data, special events data, social media data, calendars, and the like and stores the received data as historical data 252. Historical data 252 may be received from one or more planning and execution systems 140, one or more external systems 150, one or more supply chain entities 160, one or more computers 170, and/or one or more locations local to, or remote from, supply chain network 100. Historical data 252 may comprise, for example, historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. In addition, historical data 252 may comprise any other historical data from supply chain network 100, such as any input to any process, plan, or calculation, any output from any solver or other module of any planning and execution system 140, and any statistical, aggregated, disaggregated, or otherwise transformed data from any input or output.

As disclosed above, strategic planning system 130 comprises server 132 and database 134. Although strategic planning system 130 is shown as comprising a single server and a single database, embodiments contemplate any suitable number of servers or databases internal to or externally coupled with strategic planning system 130.

Server 132 of strategic planning system 130 comprises planning module 260. Although server 132 is shown and described as comprising a single planning module 260, embodiments contemplate any suitable number or combination of planning modules located at one or more locations, local to, or remote from strategic planning system 130, such as on multiple servers or computers at one or more locations in supply chain network 100. Planning module 260 may comprise modeler 262 and one or more solvers 264. Although planning module 260 is shown and described as comprising a single modeler 262 and a single one or more solvers 264, embodiments contemplate any suitable number or combination of these located at one or more locations, local to, or remote from planning module 260, such as on multiple servers or computers at any location in supply chain network 100.

Database 134 of strategic planning system 130 may comprise one or more databases or other data storage arrangement at one or more locations, local to, or remote from, server 132. Database 134 of strategic planning system 130 comprises, for example, supply chain models 266 and solver output 268. Although database 134 of strategic planning system 130 is shown and described as comprising supply chain models 266 and solver output 268, embodiments contemplate any suitable number or combination of data, located at one or more locations, local to, or remote from, supply chain strategic planning system 130, according to particular needs.

Modeler 262 of strategic planning system 130 may model one or more supply chain planning problems, what if scenarios, and network models of supply chain network 100. According to one embodiment, modeler 262 identifies resources, operations, buffers, and pathways, and maps supply chain network 100. For example, modeler 262 models a supply chain planning problem that represents supply chain network 100 as a supply chain network model, an LP optimization problem, or other input to one or more solvers 264. According to embodiments, one or more solvers 264 of planning module 260 generates a solution to a supply chain planning problem. One or more solvers 264 may comprise an LP optimization solver, a heuristic solver, a deep tree solver, a mixed-integer problem solver, and the like. According to embodiments, one or more solvers 264 receives one or more input values and generates one or more output values. The input values may comprise costs, constraints, and other like inputs, and the output values may comprise any KPI. Supply chain models 266 comprise one or more modelled supply chain networks, planning problems, manufacturing processes, and the like. Supply chain models 266 may represent the flow of materials through one or more supply chain entities 160 of supply chain network 100. Modeler 262 may model the flow of materials through one or more supply chain entities 160 of supply chain network 100 as one or more supply chain network models comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network 100 models may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Supply chain models 266 may include any dynamic supply chain data, including for example, the one or more material constraints, one or more capacity constraints, lead times, yield rates, inventory levels, safety stock, demand dates, and/or the like. In addition, or as an alternative, supply chain models 266 may include supply chain costs (such as, for example, processing and handling costs, transportation costs, inventory costs, fixed costs for operating, opening or closing modelled components or entities, and the like).

Solver output 268 comprises a solution, a KPI value, a plan, or other like output from one or more solvers 264. In one embodiment, one or more solvers 264 receive input values and transmit KPI values as solver output 268. To get the output data from one or more solvers 264, risk management visualization system 110 communicates with one or more solvers 264 to trigger one or more solvers 264 to fetch initial data to analyze. In one embodiment, one or more solvers 264 comprises a linear programming optimization solver and the output results comprise the KPI values requested by risk management visualization system 110. As disclosed above, risk management visualization system 110 may transmit requests to one or more solvers 264 using update and retrieval APIs 238. According to embodiments, update and retrieval APIs 238 may comprise parameters that indicate, for example, a particular model to be used by one or more solvers 264, the identity and value of particular inputs, the format of results, and the like.

Figure 3:
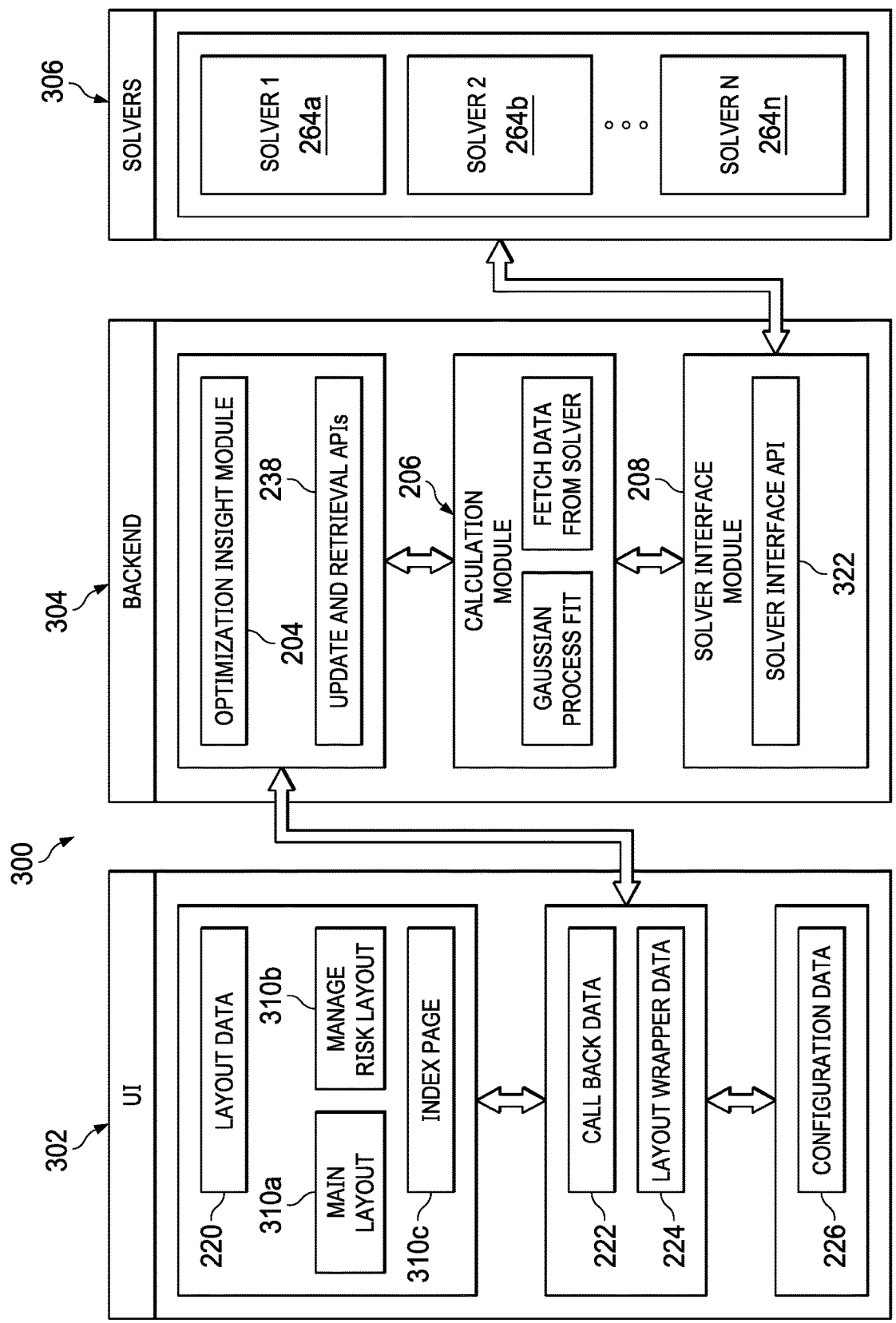
FIG. 3 illustrates the risk management visualization system of FIG. 1, according to an alternative embodiment.

FIG. 3 illustrates risk management visualization system 110 of FIG. 1, according to an alternative embodiment. In this embodiment, risk management visualization system 110 comprises three layers: UI layer 302, backend layer 304, and solvers layer 306. In this alternative embodiment, UI layer 302 comprises UI module 202, layout data 220, call back data 222, layout wrapper data 224, and configuration data 226. Continuing with this alternative embodiment, backend layer 304 comprises optimization insight module 204, update and retrieval APIs 238, calculation module 206, and solver interface module 208. In addition, solvers layer 306 comprises one or more solvers 264a-264n that calculate the KPI of a supply chain planning problem for one or more input values received from risk management visualization system 110, as disclosed above.

In one embodiment, layout wrapper data 224 couples UI layer 302 to backend layer 304 and fetches values to display in risk management dashboard 600. In one embodiment, UI module 202 displays the visualizations and the interactive elements on risk management dashboard 600 using, for example, python script modules: a main layout 310a, a risk management layout 310b, and an index page 310c. According to embodiments, index page 310c retrieves the KPI names and input names from one or more configuration files of configuration data 226. In addition, or as an alternative, main layout 310a configures the risk management dashboard 600 and its UI components. Embodiments of the risk management layout 310b are called in response to selection of REPLAN button 618 of risk management dashboard 600, as described in further detail below. As disclosed above, UI module 202 uses one or more call back scripts of call back data 222 to transmit requests to solver interface module 208, process solver output 268 received from one or more solvers 264a-264n, and update one or more visualizations of risk management dashboard 600 according to a processed solver output 268 from one or more solvers 264a-264n. Layout wrapper data 224 comprises prepares component values for UI module 202 of UI layer 302.

Configuration data 226 of UI layer 302 describes the inputs and KPIs that are displayed on risk management dashboard 600. For a different dashboard, configuration data 226 may specify a different KPI and different inputs. Backend layer 304 retrieves the mean and standard deviation from mean and standard deviation data 232 for the inputs identified in configuration data 226. When mean and standard deviation data 232 are not available, backend layer 304 calculates the mean and standard deviation from the distribution of values for the input variables according to historical data 252.

Calculation module 206 builds surrogate model by approximating the relationship between a single input value and a resulting KPI. During an exploration phase, one or more solvers 264a-264n of solvers layer 306 receives one or more sample inputs for the initial exploration and calculates the resulting KPI values. During a learning phase, one or more solvers 264a-264n receives input variable values for new exploration points and calculates the resulting KPI values.

To find better sample points for building surrogate model 228, calculation module 206 uses acquisition function 230 to find inputs with high uncertainties and inputs with high derivative values. Acquisition function 230 may comprise, for example, the maximum probability of improvement (MPI) acquisition model, the expected improvement (EI) acquisition model, the upper confidence bound (UCB) acquisition model, and the like, according to particular needs. To get the sample data used to build surrogate model 228, backend layer 304 uses data update and retrieval APIs 238 to trigger one or more solvers 264a-264n to fetch initial data to analyze, to determine the status of a calculation, the state of one or more solvers 264a-264n, and the like.

Calculation module 206 uses the UCB as the acquisition function and collects the sample data from one or more solvers 264a-264n of solver layer 306 with the assumption that input data is normally distributed with the mean and standard deviation calculated from the historical input data. Initial exploration points 302a-302c are calculated and may include, for example, minimum, maximum, and mean, as described in further detail below. Calculation module 206 of backend layer 304 predicts KPI values from a surrogate model of each input and a range of KPI uncertainty based on the selected risk range and the variability and range of the inputs, as shown and described in further detail in connection with visualization dashboard 600, below.

As disclosed above, backend layer 304 communicates with one or more solvers 264a-264n of solvers layers 306 using data update and retrieval APIs 238. By way of further explanation only and not way of limitations, examples of particular APIs 238 used to communicated between backend layer 304 and solvers layer 306 are now described.

A Start Solver API

The start Solver API initiates one or more solvers 264-264n to handle requests for fetching KPI for inputs.

Open Solver Model API

The Open Solver Model API causes one or more solvers 264-264n to open a supply chain models 266 specified by configuration data 226 to calculate the KPI from the indicated input variables. The Open Solver Model API triggers an asynchronous solver API call. Backend layer 304 (or other client) checks at regular intervals or on detection of one or more other initiation criteria whether one or more solvers 264-264n are busy or are available to process the request. Backend layer 304 may use a Check if Solver is Busy API to check whether one or more solvers 264-264n are busy processing any request.

Trigger Solver to Fetch KPI for Specific Input API

The Trigger Solver to Fetch KPI for Specific Input API applies a selected input value on one or more models of one or more solvers 264a-264n of solvers layer 306. As disclosed above, solvers layer 306 may, according to some embodiments, comprise strategic planning system 130. Solvers layers 306 uses solver model and triggers one or more solvers 264a-264n to fetch the KPI which is asked in the call (such as, for example, a Network Profit KPI) for a specific percentage input value. Because this API will trigger an asynchronous call on one or more solvers 264a-264n, one or more solvers 264a-264n will only return the status of the request processed. The Backend continues to check (using Check if Solver is Busy API) if one or more solvers 264a-264n is still processing a request. Once one or more solvers 264a-264n completes the request processing, the Backend calls one or more solvers 264a-264n using the getInputKPIResultPair API to fetch a JSON formatted response comprising the input and KPI pair.

Trigger Solve for List of Inputs

Trigger Solve for list of inputs API causes backend layer 304 to receive a list of input values and applies each value to solver model separately and triggers one or more solvers 264a-264n to fetch the KPI value which is asked in the call for a list of percentage input value. Because this API will trigger an asynchronous call on one or more solvers 264a-264n, one or more solvers 264a-264n will only return the status of the request processed. Backend layer 304 continues to check (using Check if Solver is Busy API) if one or more solvers 264a-264n are still processing a request. Once one or more solvers 264a-264n completes the request processing, backend layer 304 calls one or more solvers 264a-264n using the getInputKPIResultPair API to fetch a JSON formatted response comprising the input and KPI pair.

Trigger Solve for Range of Inputs

Trigger Solve for range of inputs API finds the minimum and maximum percentage value as a range with an interval. Trigger Solve for range of inputs API generates different input values based on the minimum, maximum, and interval and applies each value on solver model and triggers a solve separately to fetch KPI which is asked in the call (such as, for example, NetworkProfit) for a range of percentage input value. Trigger Solve for range of inputs API will trigger an asynchronous call on one or more solvers 264a-264n, one or more solvers 264a-264n will only return the status of the request processed. Backend layer 304 continues to check (using Check if Solver is Busy API) if one or more solvers 264a-264n are still processing a request. Once one or more solvers 264a-264n completes the request processing, backend layer 304 calls one or more solvers 264a-264n using the getInputKPIResultPair API to fetch a JSON formatted response comprising the input and KPI pair.

Get List of Input-KPI Pair as a Result of Solver Call API

The Get list of input-KPI pair as a result of Solver call API returns a list of input variable values and KPI value pairs. This API applies each value of a list of input values against the solver model separately and solves each separately. After one or more solvers 264a-264n fetches the KPI values which is asked in the call and fetches a JSON list of input variable values and KPI value pairs.

Although particular embodiments of APIs are shown and described for an alternative embodiment of risk management visualization system 110 comprising a system architecture having UI layer 302, backend layer 304, and solvers layer 306, embodiments contemplate any suitable arrangement or combination of any number of layers and any suitable APIs, according to particular needs.

Figure 4:
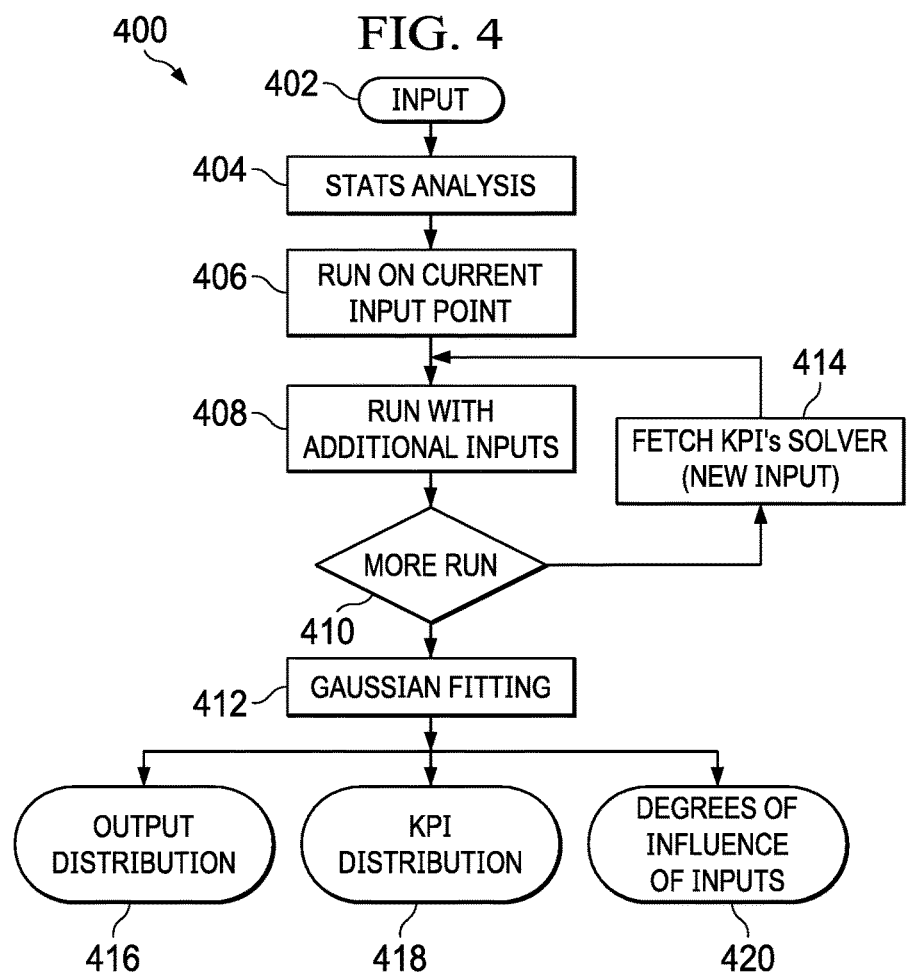
FIG. 4 illustrates a method of profiling risk for one or more KPIs, according to an embodiment.

FIG. 4 illustrates method 400 of profiling risk for one or more KPIs, according to an embodiment. Risk management visualization system 110 begins method 400 by receiving inputs identified in configuration data 226 at activity 402. At activity 404, risk management visualization system 110 models the input variability by performing a statistical analysis on the received inputs to determine the mean and standard deviation. The exploration points are chosen and risk management visualization system 110 calls one or more solvers 264a-264n to calculate the KPIs for two or three data points in the given input range at activity 406.

At activity 410, risk management visualization system 110 checks if more solutions are needed from the one or more solvers 264a-264n. When the KPI is complex, an increasing number of solving runs for other input values may need to be run before performing Gaussian process fit at activity 412. Embodiments contemplate running one or more solvers 264a-264n approximately five through ten times iterations, or any number of one or more iterations based on the complexity of the KPI and according to particular needs. After receiving the additional KPI values for the additional input values from the one or more solvers 264a-264n at activity 414, risk management visualization system 110 runs the fitting of the Gaussian process with additional inputs at activity 412. When no more runs are required (e.g. one or more stopping criteria are met, as described in further detail below), risk management visualization system 110 prepares the UI components to visualize the calculated risk profile visualizations for the output distribution at activity 416, the KPI distributions at activity 418, and the degree of influence at activity 420, as described in further detail below.

Figure 5:
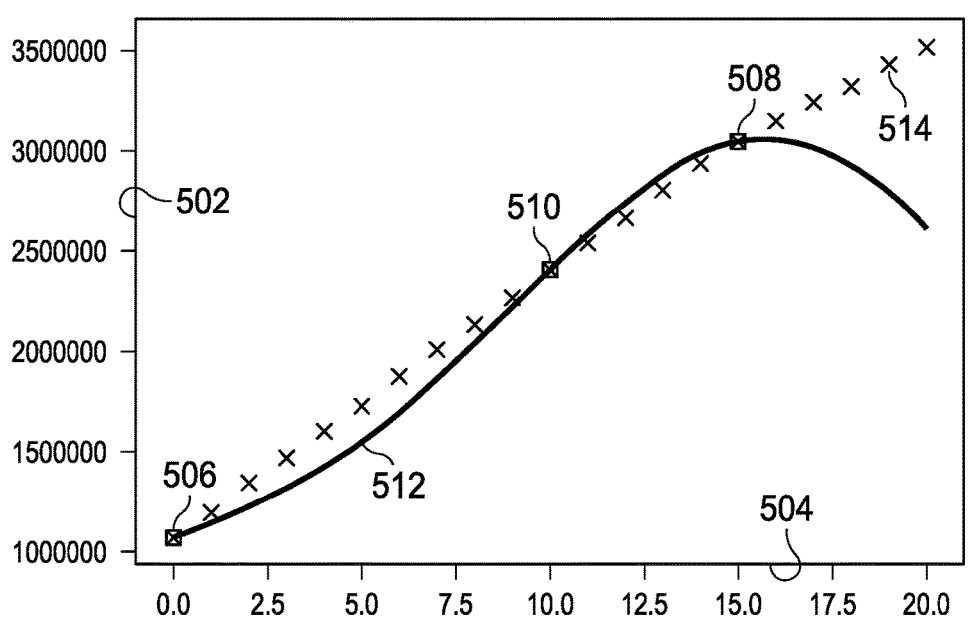
FIG. 5 illustrates fitting of a Gaussian process, according to an embodiment.

FIG. 5 illustrates fitting of a Gaussian process, according to an embodiment. Chart 500 comprises fitting Gaussian process to input data assuming a normal distribution with the mean and standard deviation calculated from historical data 252 for predicted KPI values (y-axis 502) at various values of the input variable (x-axis 504). Chart 500 comprises the actual values of the mean KPI calculated for each 2% change in a first input variable. Initial exploration points calculated by risk management visualization system 110 comprise minimum 506, maximum 508, and mean 510. Curve 512 indicates the surrogate model that is fit to the selected data points 514. Selected data points 514 comprise those data points where risk management visualization system 110 has received the calculated KPI value for a particular value of the input variable. By way of example only and not by way of limitation, risk management visualization system 110 may receive the calculated mean network profit from one or more solvers 264a-264n. Using the evaluated data, risk management visualization system fits a Gaussian process to the evaluated data points. In this example, risk management visualizations system 110 uses upper confidence bound (UCB) as the acquisition function (as described in further detail below) and collects the sample data from solver 264 of strategic planning system 130.

Fitting the Gaussian Processes

According to embodiments, risk management visualization system 110 utilizes a surrogate model and a kernel to learn the model and estimate the output values for the inputs. By way of example only and not by way of limitation, the kernel comprises RBF, Matern, or the sum of RBF and Matern. Although particular kernels are described, embodiments contemplate using any suitable kernel or sum of kernels, according to particular needs.

As disclosed above, risk management visualization system 110 calculates risk profiles for KPIs that have probabilistic inputs based on the KPI values calculated from any one or more solvers 264a-264n. Fitting the Gaussian processes includes sending one or more input values to one or more solvers 264a-264n and receiving the calculated KPI value in return. In addition, risk management visualization system 110 receives the range of input values for the input variables, an acquisition function, and a selected confidence interval (such as, for example, a 95% confidence interval equal to two σ, a 99% confidence interval equal to three σ, etc.).

Fitting the Gaussian processes to the surrogate model comprises an exploration phase and a learning phase.

Exploration Phase

During the exploration phase, risk management visualization system 110 selects three sample input values for initial exploration. In one embodiment, the initial exploration values are selected as the minimum, the average, and the maximum values for each input variable, as disclosed above. Risk management visualization system 110 calls one or more solvers 264a-264n for the selected initial inputs and receives solver output data 268 comprising the resulting calculated KPI value. In addition, risk management visualization system 110 fits the Gaussian process for the given kernel and explored data points, which predicts the mean KPI value and the standard deviation for the unexplored input range.

Learning Phase

During the learning phase, risk management visualization system 110 calculates the standard deviation value required for given confidence interval (CI) (e.g. for 95% CI is equal to 2 σ, 99% CI is equal to 3 σ, etc.), calculates the upper and lower bound of the KPI value with predicted mean and standard deviation at the selected CI, calculates the next exploration point using an acquisition function to find inputs with highest uncertainty or inputs with greatest derivative value, sends the exploration points to one or more solvers 264a-264n, and receives the KPI values used to model the KPI-input relationship to fit a Gaussian process with the new explored points. Risk management visualization system 110 iteratively performs the learning phase until one or more stopping criteria are met, such as, for example, detecting the desired accuracy of mean, the desired standard deviation, a predetermined number of iterations, and the like.

In addition, or as an alternative, risk management visualization system 110 identifies new exploration points by selecting the sample values that are sent to one or more solvers 264a-264n as the values of the input variables having the greatest uncertainty and the values of the input variables having the greatest derivative. In order to find better sample points for building a surrogate model, risk management visualization system 110 uses an acquisition function, such as, for example, maximum probability of improvement (MPI), expected improvement (EI), and UCB, as disclosed above. In one embodiment, system 110 performs an exploitation process by sampling where a surrogate model predicts a high objective and performs exploration by sampling at locations where the prediction uncertainty is high. Both correspond to high acquisition function values, wherein the goal is to maximize the acquisition function to determine the next sampling point. In response to receiving output data from one or more solvers 264a-264n for the sample input values, risk management visualization system 110 uses the received corresponding KPI value to fit the input and KPI value to the Gaussian process to further refine the surrogate model. Risk management visualization system 110 continues until detecting one or more stopping criteria. When the one or more stopping criteria are not detected, risk management visualization system 110 returns to learning phase and iteratively performs the learning phase activities until one or more stopping criteria are detected.

Risk Profile

Figures 6, 6A:
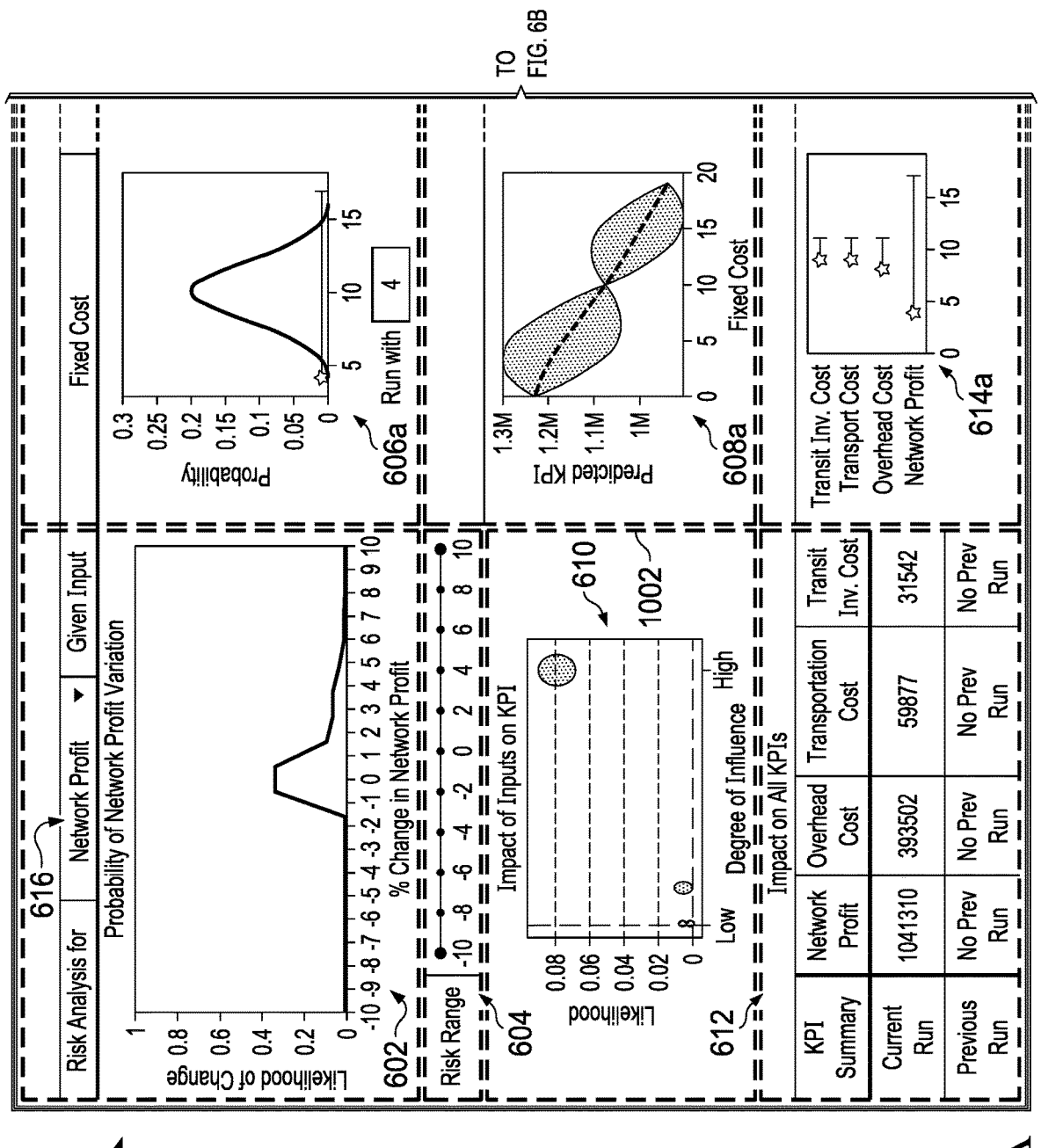
FIGS. 6A-6B illustrate a risk management dashboard, according to an embodiment.
Figure 6B:
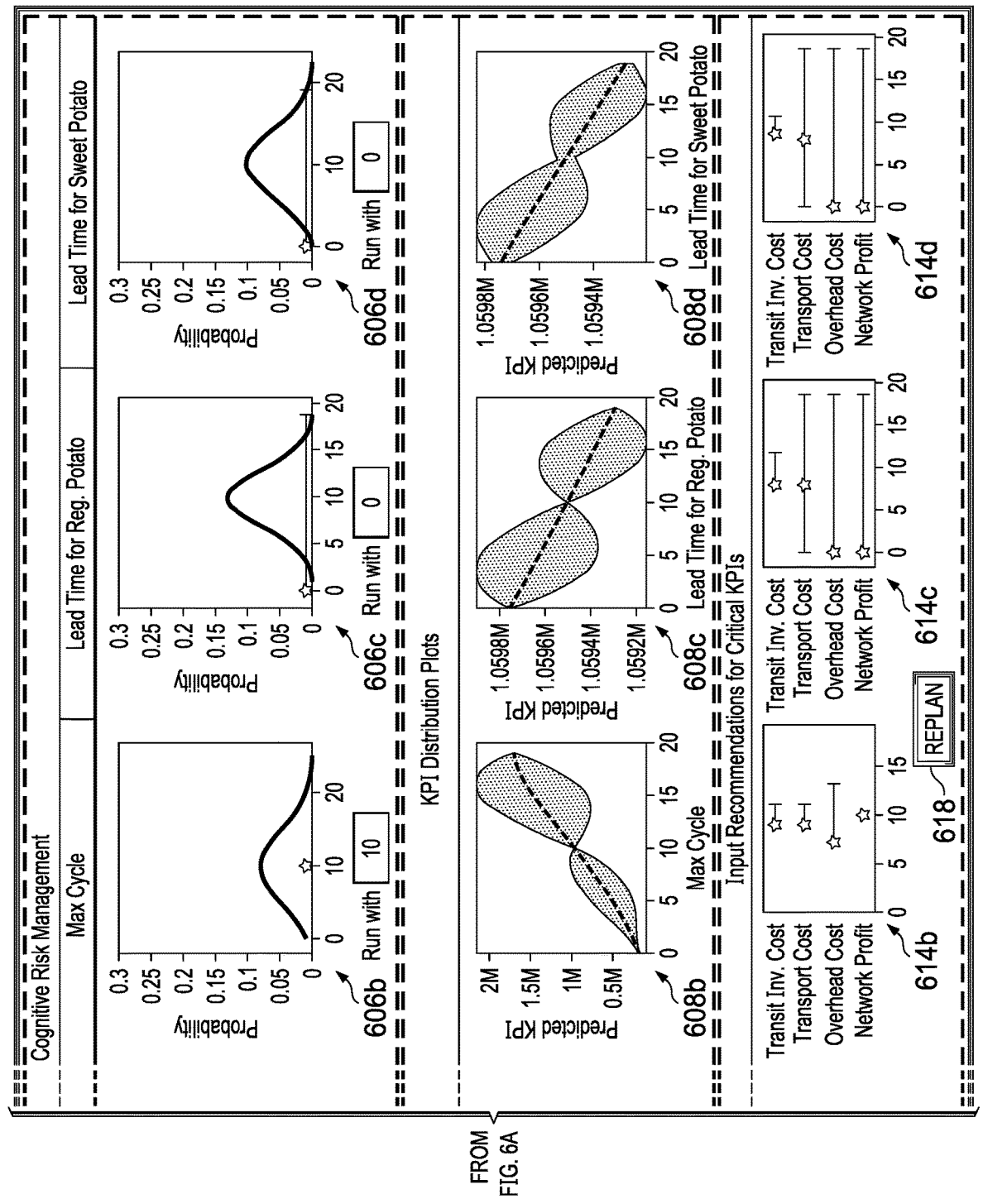

FIGS. 6A-6B illustrate risk management dashboard 600, according to an embodiment. Risk management dashboard 600 comprises visualizations and interactive elements for profiling and managing risk of supply chain plans. As disclosed above, risk management dashboard 600 displays visualizations that profile the risk that one or more KPIs will change within a selectable range of acceptable risk based on the variability of values for various input variables. In addition, interactive elements provide for selecting particular one or more KPIs to analyze, values for input variables, and a range of acceptable risk. In response to the selections, risk management dashboard 600 updates a display of the risk profile, which may include, but is not limited to:

- the variability, feasible range, and optimal value of the input variables;
- the variability, optimal value, and likelihood of change of a KPI;
- the inputs having the greatest influence on a KPI value; and
- the risk that a KPI will deviate from the current value.

In one embodiment, risk management dashboard 600 comprises KPI risk chart 602, risk range selector 604, input distribution charts 606a-606d, KPI distribution charts 608a-608d, input impact visualization 610, KPI impact visualization 612, input recommendation visualizations 614a-614d, risk analysis selector 616, and replan button 618. As disclosed above, risk management dashboard 600 may display visualizations for the expected values for four KPIs (Transit Inv. Cost, Transport Cost, Overhead Cost, and Network Profit) based on the calculated Bayesian optimization of the following input variables: Fixed Costs, MaxCycle, lead time for Item 1 (Regular Potato), and lead time for Item 2 (Sweet Potatoes). Continuing with this example, KPI risk chart 602 displays risk for a network profit KPI. In response to selection of a different KPI using risk analysis selector 616, such as, for example, overhead cost, transportation cost, and transit inv. costs, risk management visualization system 110 automatically updates the visualizations of risk management dashboard 600 to show the data for the selected KPI. Risk range selector 604 provides an interactive visual element for adjusting range of acceptable risk for the selected KPI. As described in further detail below, in response to modification of a risk range by risk range selector 604, risk management visualization system 110 updates KPI risk chart 602 based on the selected risk range.

Input distribution charts 606a-606d comprise the modeling of the distribution of values for each four input variables: Fixed Costs, MaxCycle, lead time for Item 1, and lead time for Item 2. Although lead time input variables for the first and second item indicate the lead time for a particular item, input distribution charts 606a-606d are calculated at a granularity of the model. By way of example only and not by way of limitation, if the input values (or their variability parameters, such as, for example, the mean and standard deviation) are known for items only at the product group level, risk management dashboard 600 may display the risk profile and the input variability according to the product group. In the illustrated example, the MaxCycle is set at the plan level, and the lead times are set at the item level. However, embodiments contemplate input variables comprising any grouping or granularity (such as, for example, plan level, product group level, item level, SKU level, and the like), according to particular needs.

KPI distribution charts 608a-608d comprise KPI values are calculated for the given inputs for a value ranging from 0 to 20. For example, assuming the lead time varies from 0 to 20 days, KPI distribution charts 608a-608d display the calculated mean for the KPI at each lead time, and a range of KPI values that are predicted to occur based on a particular lead time for a predetermined confidence interval. Input impact visualization 610, KPI impact visualization 612, and input recommendation visualizations 614a-614d provide display the risk of the selected KPI as well as the influence, variability, range of feasible values, and optimal values of the input variables.

Each of the visualizations and interactive visual elements of risk management dashboard 600 will now be discussed.

KPI Risk Chart

Figure 7:
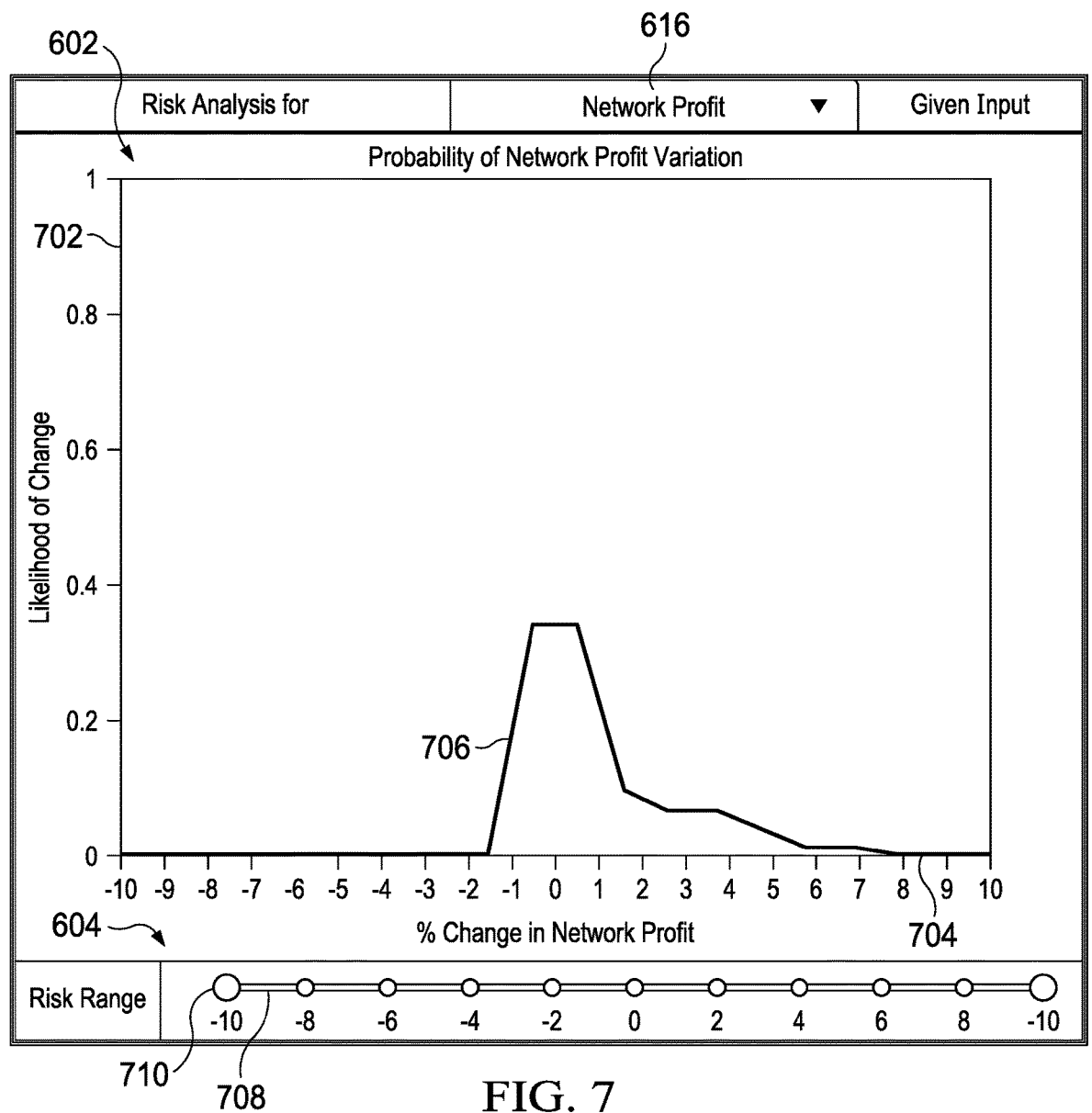
FIG. 7 illustrates a KPI risk chart, risk range selector, and risk analysis selector, according to an embodiment.

FIG. 7 illustrates KPI risk chart 602, risk range selector 604, and risk analysis selector 616, according to an embodiment. KPI risk chart 602 indicates the likelihood (y-axis 702) that a KPI value will deviate from the current value by a particular percentage (x-axis 704). Risk range selector 604 comprises risk range bar 708 and slider 710, which provides for selecting the acceptable percentage change above and below the predicted KPI value.

By way of example only and not by way of limitation, the acceptable percentage change extends from 10% below the predicted value of the KPI to 10% above the predicted value of the KPI. Continuing with this example, curve 706 displayed on KPI risk chart 602 showing the least amount of risk would comprise a horizontal line (likelihood of change is equal to 0) for all percentage changes in network profit, except at zero percentage change in network profit (i.e. when x is equal to 0), where the likelihood of change would be 1.0 (i.e. a 100% chance that the risk would be 0%).

For the scenario illustrated by curve 706, the KPI risk was calculated using mean input values. KPI risk chart 602 indicates that there is some risk that the actual value of the KPI (here, network profit) will be above or below the current value. The visualization of KPI risk chart 602 illustrates this risk by the value of the likelihood of change being significantly above 0 for % change in KPI from −1% to +5%, which indicates a large range of possible KPI values. However, the risk of network profit staying at the current value is approximately 38%. In addition, KPI risk chart 602 indicates that the likelihood of network profit falling below 98% is essentially zero, while the likelihood of the actual network profit not exceeding the current value by 2% is approximately 10%.

Risk Range

As disclosed above, risk range selector 604 provides for modifying the selected range of acceptable risk. In one embodiment, risk range selector 604 is located below KPI risk chart 602. The risk range selector provides for selecting a lower bound for the acceptable percent reduction of the current KPI prediction and the upper bound for the acceptable percent increase over the KPI prediction by selecting and moving the interactive visual element comprising one or more sliders 710 along risk range bar 708. For example, setting one or more sliders 710 at +5 and −5 along risk range bar 708 provides a risk range of +5, which maintains the KPI risk to within 95% to 105% of the predicted KPI value. Continuing with the illustrated example, the selected KPI is network profit (as shown by risk analysis selector 616) and the acceptable risk is selected on risk range selector 604 from ten percent less than the current value up to ten percent more than the current value. Although the illustrated risk range selector extends from −10% to +10%, and the KPI risk chart 602 illustrates the likelihood of the KPI falling within the range of 90% and 110% of the current value, the percentage change in KPI may be calculated for any range extending above, below, or both above and below any change in a current KPI value, according to particular needs. As described in further detail below, risk management visualization system 110 uses the risk range not only to calculate and display KPI risk chart 602, but also to determine the range of feasible input values.

Upon launching risk management dashboard 600, embodiments of risk management visualization system 110 display an initial risk profile. According to embodiments, initial risk profile comprises a risk profile for the KPI having the greatest risk and the optimal input values having the greatest degree of influence on the KPI prediction. By way of example only and not by way of limitation, when input variables have low variability, curve 706 of KPI risk chart 602 would have a steep curve. In that case, the risk associated with the plan may be low, and the planner does not trigger a replan. However, when the amount of risk resulting from the initial values displayed by risk management dashboard 600 is not acceptable, risk management visualization system 110 may modify one or more of the initial input values to reduce the risk by adjusting the input values, and initiating a replan in response to detecting selection of the REPLAN button 518 of risk management dashboard 600.

According to embodiments, KPI risk chart 602 describes a risk profile for each input variable calculated based on the percentage change in the KPI from the current predicted KPI value (which may also be referred to as the base value) for each percent change in the KPI from a lower bound to an upper bound. In one embodiment, risk management visualization system 110 In one embodiment, calculation module 206 computes the probability of the KPI being less than or equal to the base KPI, assuming KPI is a random variable and calculates the input probability for each % change from the base value for each input value of the risk range (i.e. −10%, −9%, −8%, . . . −1%, 0, +1%, +2, %, . . . 9%, 10%). In addition, or as an alternative, risk management visualization system 110 sets the initial total return probability equal to zero, and for each input value, wherein the probability of at least one change in the input variable value is equal to the probability of the KPI equals k % of the KPI base value, the total return equals the probability of the value of the input variable multiplied by the probability of at least one change in the value of the input variable, and the total KPI value probability is the total return probability divided by the sum of the probabilities of each value of the input variables.

KPI Risk Chart Comparing Initial Run and Current Run

Figure 8:
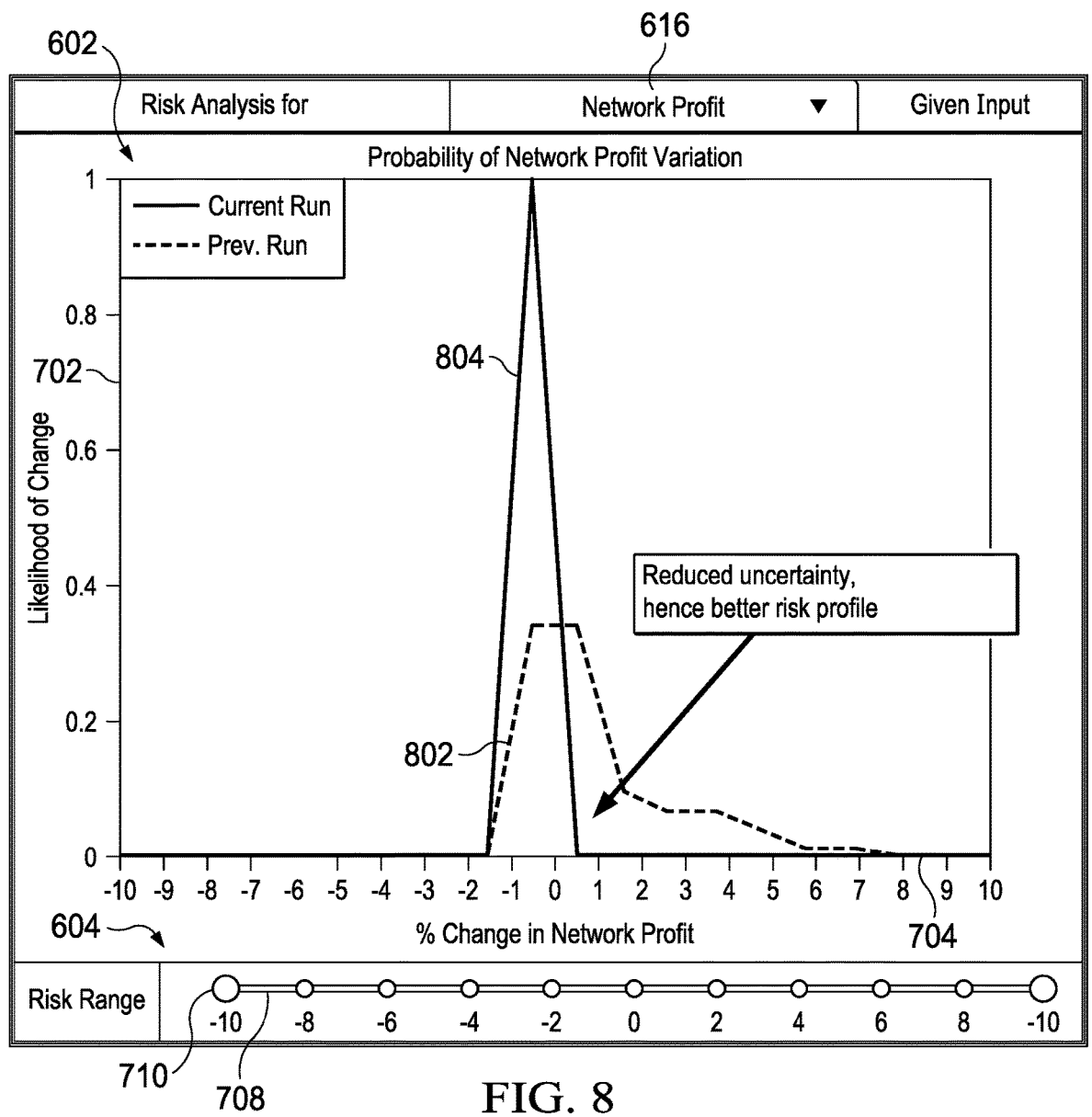
FIG. 8 illustrates a KPI risk chart, according to an embodiment comprising a second run.

FIG. 8 illustrates KPI risk chart 602, according to an embodiment comprising a second run. After modifying one or more inputs, risk management visualization system 110 updates KPI risk chart 602 to display the risk profile for the initial run (the previous run—802) and the risk profile for a run with modified input values (current run—804). As disclosed above, the KPI risk for previous run 802 (e.g. curve 706 of KPI risk chart 602 of FIG. 7) was calculated using mean input values. KPI risk chart 602 indicates the likelihood of network profile remaining at the current value for previous run 802 is approximately 38%. For the scenario illustrated by current run 804 with modified input values, risk management visualization system 110 calculates the KPI risk profile after adjusting the modelled input values. In this example, KPI risk chart 602 indicates the likelihood of the actual value remaining at the predicted value is nearly 100%. In this scenario, the underlying risk has been reduced and there is less uncertainty in the KPI values being observed.

Risk Profile

As described below, the risk profile for each input variable is calculated based on the percentage change in the KPI from the current predicted KPI value (which may also be referred to as the base value) for each percent change in the KPI from the lower bound to the upper bound. In one embodiment, risk management visualization system 110 generates the risk profile for each input variable by calculating the likelihood of the KPI falling or increasing by k % of the base KPI from (x, y)=(input value, KPI value) and the standard deviation of y (i.e. standard deviation of KPI value) and setting the base value as the mean of the KPI values for the range of input variable values. In one embodiment, calculation module 206 computes the probability of the KPI being less than or equal to the base KPI, assuming KPI is a random variable, and calculates the input probability for each % change from the base value for each input value of the risk range (i.e. −10%, −9%, −8%, . . . 1%, 0, +1%, +2, %, . . . 9%, 10%). Risk management visualization system 110 sets the initial total return probability equal to zero, and for each input value, wherein the probability of at least one change in the input variable value is equal to the probability of the KPI equals k % of the KPI base value, the total return equals the probability of the value of the input variable multiplied by the probability of at least one change in the value of the input variable, and the total KPI value probability is the total return probability divided by the sum of the probabilities of each value of the input variables.

Risk Profile for Joint Inputs

Risk management visualization system 110 calculates the interval list and joint likelihood list for each KPI using the interval list and probability list for each input variable (e.g. the input probability for each % change from the base value for each input value of the risk range). As disclosed above, risk management visualization system 110 initializes a joint probability list by creating a list with each interval as a list with all ones for the size of the selected interval (i.e. when the risk range is set to +10 to −10, then the interval list will have 21 entries, one entry for each of the interval points (e.g. −10, −9, −8, −7, . . . 0, +1, +2, +3, . . . +9, +10).

For each interval in the interval list, risk management visualization system 110 calculates the joint probability for all input variables at that interval by multiplying the calculated probability of the KPI at the interval (as calculated above) and adds to this value, the calculated joint probability to the correct interval on the list.

In addition, risk management visualization system 110 normalizes the joint probability list so the sum of all probabilities is equal to one and computes the probability density function values for the joint probability list to add to a joint likelihood list, wherein, each value of the joint likelihood list is equal to $(y_i-y_{i-1})/(x_i-x_{i-1})$ for i=1, 2, . . . n, for each $y_0$=value of the joint probability list at point 0, and $x_0$=value of the interval list at point 0. After risk management visualization system 110 normalizes the joint likelihood list to restrict values to between 0 and 1, risk management visualization system 110 appends the calculated values to the joint likelihood list and generates an output comprising, for each interval on the list, the joint likelihood.

Using the given means and standard deviations from mean and standard deviation data 232, as disclosed above, the input distribution is modelled for each of the four input variables by distribution visualizations 606a-606d.

Input Distribution Visualizations

Figure 9:
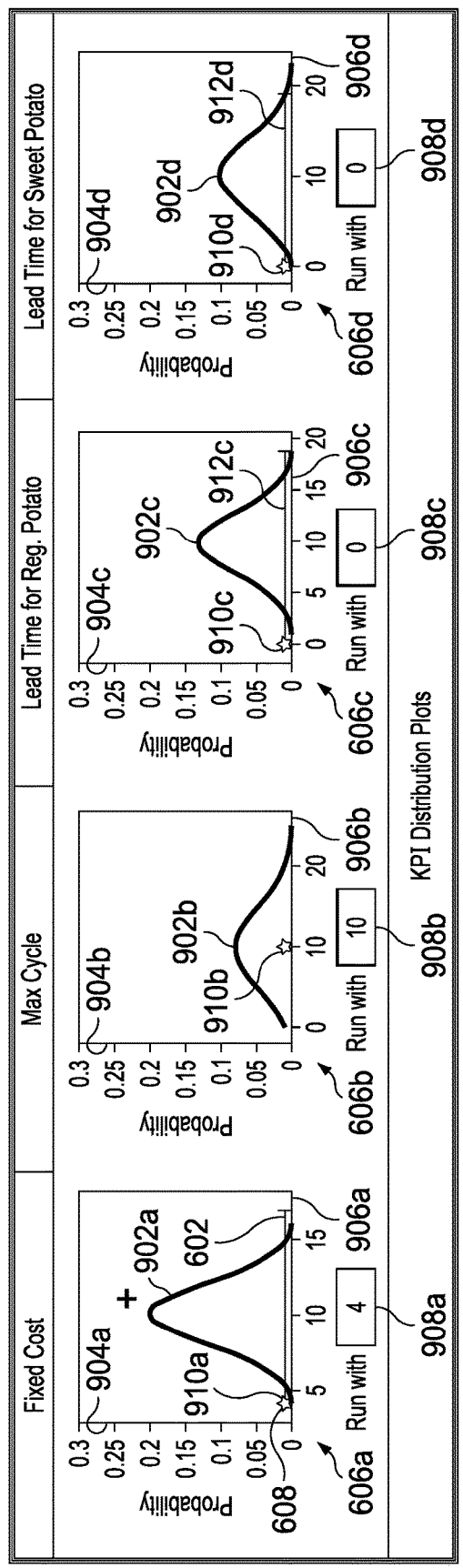
FIG. 9 illustrates input distribution visualizations, according to an embodiment.

FIG. 9 illustrates input distribution visualizations 606a-606d, according to an embodiment. Curves 902a-902d illustrate the distribution of the input variable values. By way of explanation only and not by way of limitation, input distribution visualizations 606a-606d are described in connection with the previously described illustrated example, wherein risk management dashboard 600 models four inputs: Fixed Costs, MaxCycle, lead time for Item 1, and lead time for Item 2. Curves 902a-902d indicate the probability (y-axis 904a-904d) of occurrence for various values of the input (x-axis 906a-906d). Input distribution charts 606a-606d comprising a curve that is wide and shallow (such as, for example, curve 902b for the MaxCycle input variable) indicates an input having greater variability. Input distribution charts 606a-606d comprising an input with a curve that is tall and narrow (such as, for example, curve 902a for the Fixed Cost input variable) indicates an input having lesser variability.

Variable input value entry boxes 908a-908d provide an interactive visual element for modifying the input variable value. Star icons 910a-910d indicate the optimal value of the input value variable based on the currently selected KPI and risk range. For example, optimal values for lead times are as close to zero as possible, but may range over the entire range indicated by bar 912c-912d. In contrast, the optimal value for MaxCycle is 10 indicated by star icon 910b, which is also the only feasible value for MaxCycle, as indicated by the lack of a bar at the bottom input distribution visualization 606b. In response to determining the variable input (Max-Cycle) is the greatest influence on network profit KPI (as shown by impact influence visualization 610, below) and cannot be feasibly changed, risk management visualization system 110 may receive a user input comprising a modification to the variable input having the second greatest influence on network profit KPI, which, as indicated below, is the Fixed Cost input. Similar to the MaxCycle input value, risk management visualization system 110 provides an interactive element of the GUI to receive an input to modify the variable input value for Fixed Cost. For example, risk management dashboard 600 of the current example comprises the input value entry box for Fixed Cost, which displays the initial value that was calculated to provide the maximal network profit within the risk range. Although setting the Fixed Cost value to four may maximize network profit, the value of four is not feasible for the other KPIs. The feasible values for the other KPIs range from eight to eleven for the overhead cost KPI, or from nine to eleven for the Transit inv. Cost KPI and Transport Cost KPI. This indicates that the Fixed Cost input is feasible only between nine and eleven, inclusive, for all KPIs. Although the value may be set to any value from nine to eleven, the optimal value for the Transit inv. Cost KPI and Transport Cost KPI is nine, which, in this case is the value of the Fixed Cost Input that is entered into the input value entry box using the variable input value entry box 908a.

In response to the modifying the input value for Fixed Cost from 10 to 9, as disclosed above, and the REPLAN button 618 is selected, risk management visualization system 110 calculates the updated risk profile and displays the visualizations of risk management dashboard 600 to indicate the changes to the risk profile, including, for example, changes to the values of the KPIs and the display of the KPI risk chart.

KPI Distribution Charts

Figure 10:
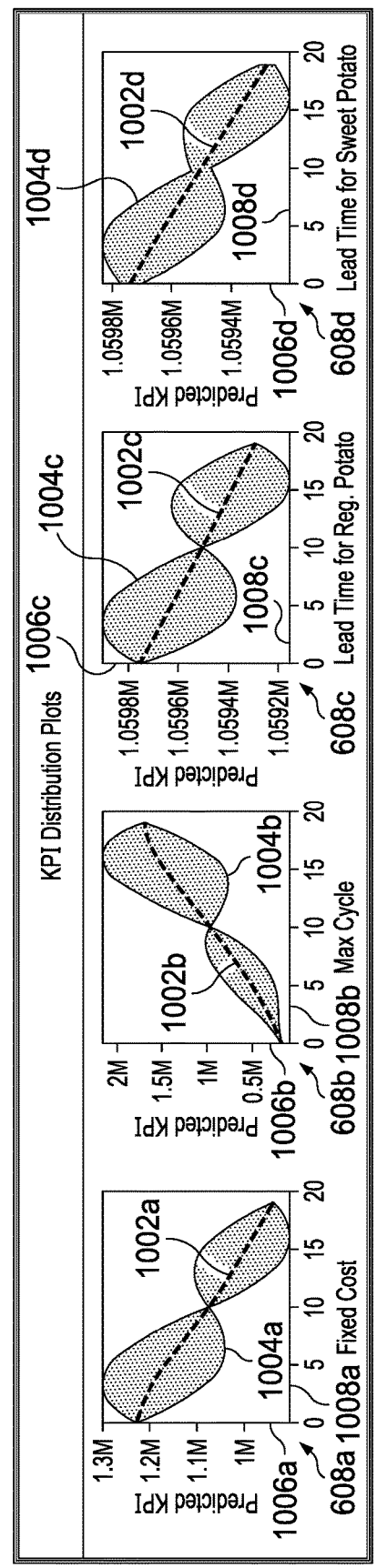
FIG. 10 illustrates KPI distribution charts, according to an embodiment.

FIG. 10 illustrates KPI distribution charts 608a-608d, according to an embodiment. Each of curves 1002a-1002d comprise at least three points indicating the initial exploration values selected to create the confidence intervals. Shaded areas 1004a-1004d, above and below curves 1002a-1002d indicate predicted KPI values falling within a selected confidence level. KPI distribution charts 608a-608d plot predicted KPI values (y-axis 1006a-1006d) based on values for a variability and a confidence interval for each of the input variables (x-axis 1008a-1008d). Risk management visualization system 110 predicts KPI values for the range of values by fitting the input variability using a Gaussian process and Bayesian optimization. For the illustrated embodiment, the KPI range is calculated for the given inputs for a value ranging from 0 to 20. When the lead time varies from 0 to 20 days, curves 1002c-1002d indicates the calculated mean for the KPI at each lead time, and the area indicated by the shaded area 1004c-1004d around curves 1002c-1002d indicates the range of KPI values (here, network profit) that are predicted to occur based on the lead time indicated on x-axes 1008c-1008d at a predetermined (such as, for example, a user-selected) confidence level.

To model the input variability, risk management visualization system 110 may use actual values from the historical data 252 for the selected inputs, the mean and standard deviation with Gaussian assumptions, or a distribution model, such as, for example, a Beta distribution model, a Gamma distribution model, and the like. After modeling the input variability, risk management visualization system 110 uses all inputs to predict the KPI values after fitting Gaussian processes to find the degree of influence of the inputs for a given KPI and model the predicted KPI values for each input variable value. According to one embodiment, curves 1002a-1002d begin as the three points represented by the initial exploration values selected to create the confidence intervals, as disclosed above. In one embodiment, the initial exploration values are selected as the minimum lead time, the average lead time, and the maximum lead time, which after being sent to one or more solvers 264a-264n, are associated with a calculated KPI value, which is used to create the mean curve and predicted KPI values falling within the selected confidence level.

Input Recommendation Visualizations

Figure 11:
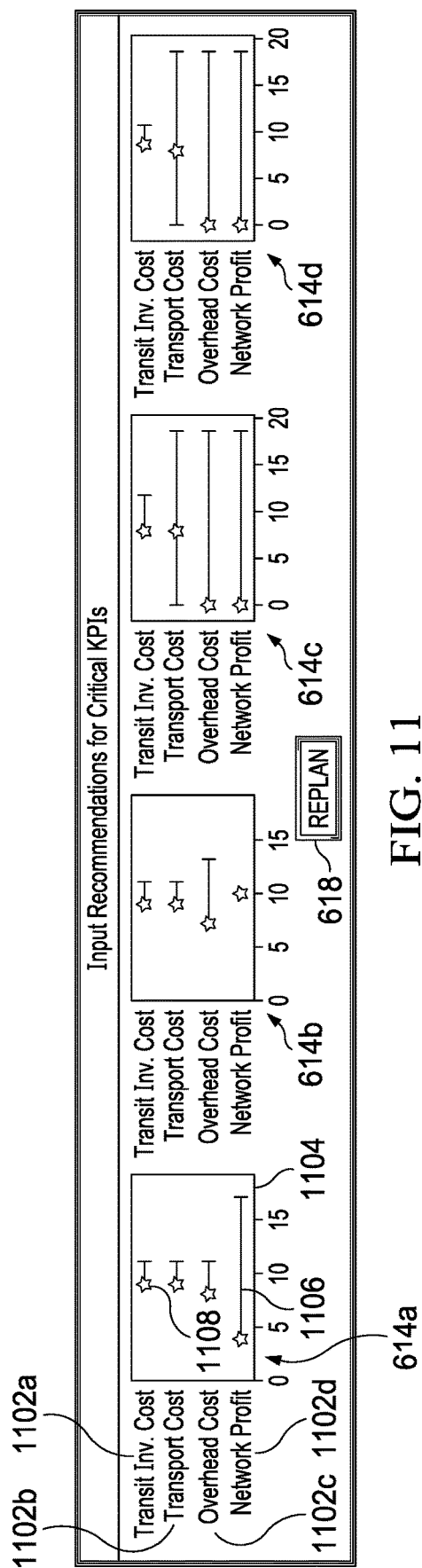
FIG. 11 illustrates input recommendation visualizations, according to an embodiment.

FIG. 11 illustrates input recommendation visualizations 614a-614d, according to an embodiment. Input recommendation visualizations 614a-614d comprise the feasible ranges and optimal values for input variables for one or more KPIs 1102a-1102d plotted against x-axis 1104. Bar 1106 is displayed for each of the four KPIs 1102a-1102d (Transit inv. Cost 1102a, Transport Cost 1102b, Overhead Cost 1102c, and Network Profit 1102d) to indicate the range of feasible input values. The feasible range of input values is the range of inputs for which the predicted KPI value will occur within the range selected for the current risk profile. The feasible range of the input is calculated using the confidence interval and selected risk range. The feasible range may be a continuous range or multiple ranges. Stars 1108 indicate the optimal input value. The optimal input value is the value of the input variable for which the KPI will be at the maximum (for KPIs representing objectives to be maximized, such as, for example, network profit) or be at the minimum (for KPIs representing objectives to be minimized, such as, for example, cost).

Risk management visualization system 110 calculates the feasible input range using the predicted KPI values, σ, of the predicted KPI values, the values of the input variables, and the selected risk range (e.g. lower bound of the range to the upper bound of the range) and the predicted KPI confidence interval.

Figure 12:
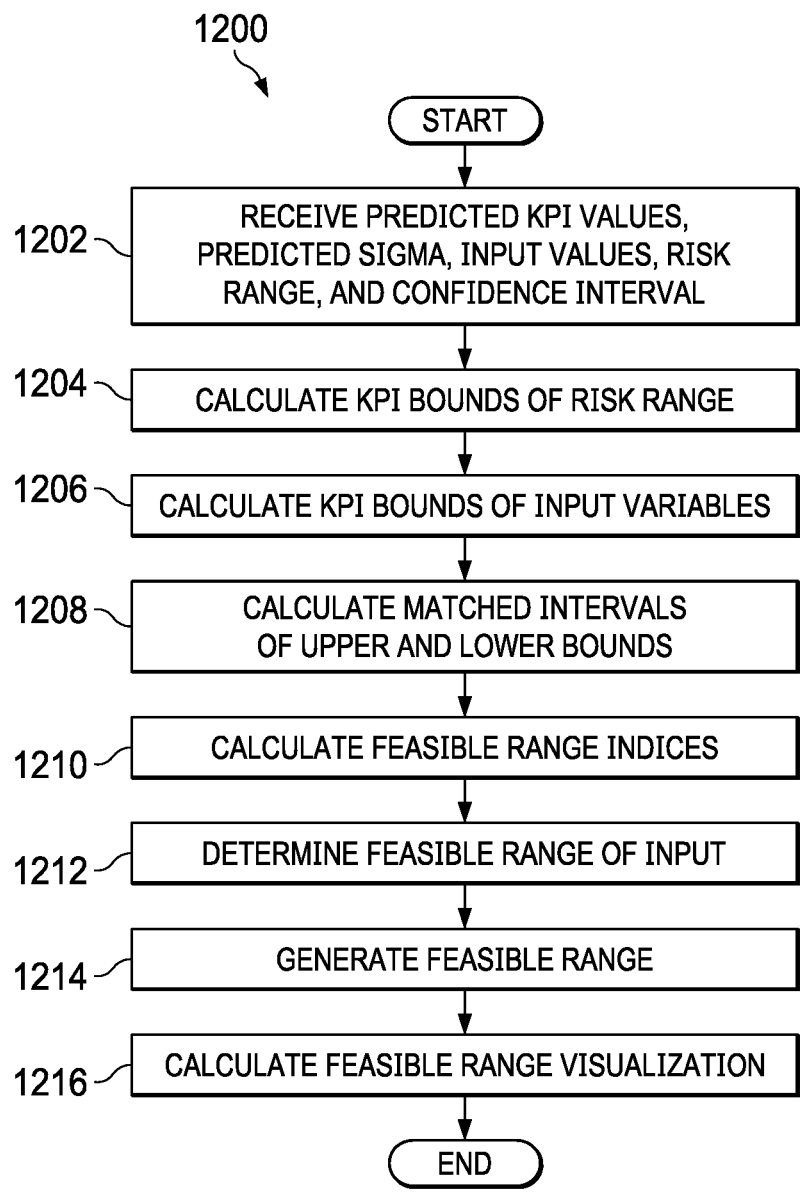
FIG. 12 illustrates a method for calculating the feasible input range, according to an embodiment.

FIG. 12 illustrates method 1200 for calculating the feasible input range, according to an embodiment. Method 1200 proceeds by one or more activities, which although described in a particular order, may be performed in one or more permutations, according to particular needs.

At activity 1202, risk management visualization system 110 receives (and/or calculates) the feasible range inputs comprising the predicted KPI values, σ of the predicted KPI values, the values of the input variables, and the selected risk range and the predicted KPI confidence interval, as disclosed above. At activity 1204, risk management visualization system 110 calculates the KPI lower bound of the risk range as the base KPI*(1-lower risk range %/100) and calculates the KPI upper bound of the risk range as the base KPI*(1-upper risk range %/100).

At activity 1206, risk management visualization system 110 calculates the lower bound and upper bound for each mean and standard deviation of the predicted KPI values by:

when the σ is not zero, the lower bound and the upper bound are equal to the Gaussian interval with given mean, σ, and confidence interval; and when the σ is zero, the lower bound and the upper bound are equal to the mean, the lower bound is equal to the KPI lower bound, the upper bound is equal to the KPI upper bound.

At activity 1208, risk management visualization system 110 calculates the matched intervals of the upper and lower bounds. According to embodiments, the matched upper bounds are all indices where all indices where KPI_ub_list>=KPI_lb, and the matched lower bounds are all indices where KPI_lb_list<=KPI_ub (i.e. the predicted KPI values where the predicted KPI values are less than or equal to the upper bound and greater than or equal to the lower bound.)

At activity 1210, risk management visualization system 110 calculates the feasible range indices as each feasible range index comprising an intersection of the matched upper bounds the matched lower bounds. At activity 1212, risk management visualization system 110 determines the feasible range of the inputs, and at activity 1214, wherein the feasible range is equal to the input values present at the indices of feasible range index based on the feasible values indices. Risk management visualization system 110 generates the feasible range visualization of input recommendation visualizations 614a-614d at activity 1216, and method 1200 ends.

Risk management visualization system 110 calculates the optimal values of the input variables using the predicted KPI values and the predicted input values. When the KPI is maximization objective, then risk management visualization system 110 calculates the optimal value of the input variable where the KPI value is the maximum, and when the KPI is a minimization objective, risk management visualization system 110 calculates the optimal value of the input variable where the KPI value is the minimum.

Risk management visualization system 110 determines a common range from the intersection of all four ranges, within which the KPI values do not deteriorate. When none of the ranges overlap, risk management visualization system 110 determines that no input value will show improvement for all of the KPIs. According to one embodiment, risk management visualization system 110 selects the input value based on previous calculations of the input value, business knowledge, and/or retains the current value. Selecting a different input value may result in some sub-optimal KPI values. Based on the feasible range and optimal value of the input variables, risk management visualization system 110 identifies the risk for the selected KPIs given the input variability, the feasible range of inputs that maintains the desired risk profile, and the sensitivity of KPIs to changes in input variable values.

Impact Influence Visualization

Figures 13, 14:
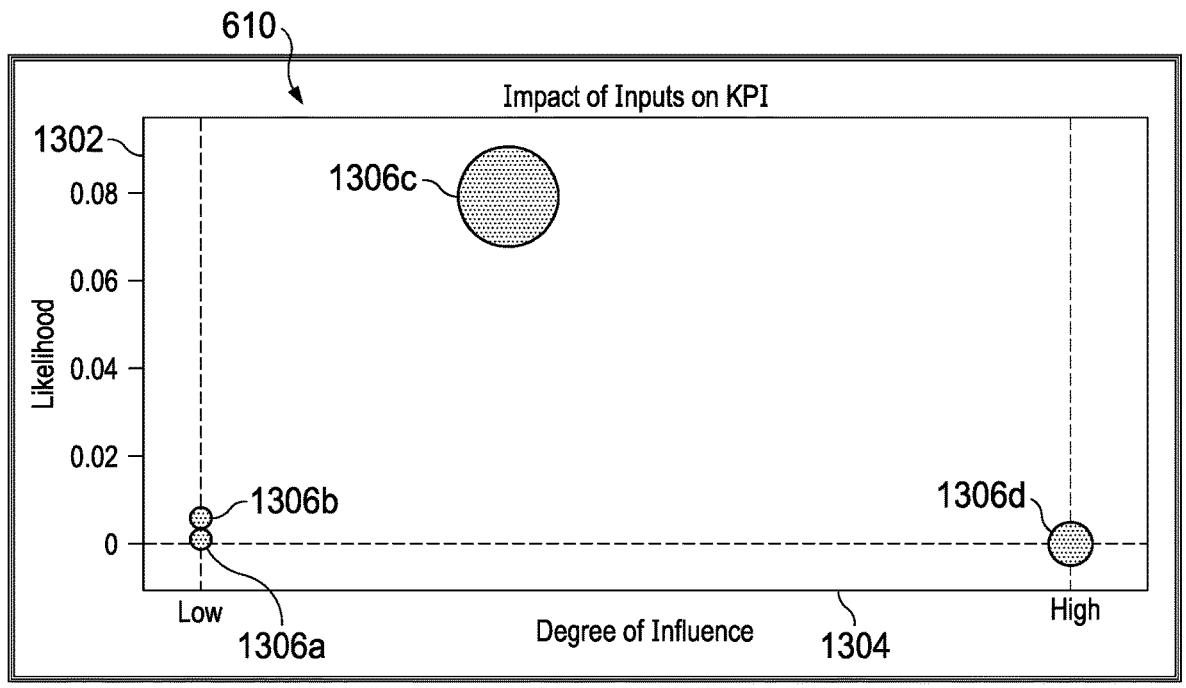
FIG. 13 illustrates an impact influence visualization, according to an embodiment.
FIG. 14 illustrates a KPI impact visualization, according to an embodiment.

FIG. 13 illustrates impact influence visualization 610, according to an embodiment. Impact influence visualization 610 comprises indicates likelihood (y-axis 1302) and degree of influence (x-axis 1304) input variables represented by data points 1204a-1204d. According to embodiments, data points 1306a-1306d comprise the most influencing inputs, which are the input variables having the greatest effect on the risk profile of the KPI. Impact influence visualization 610 plots the likelihood (y-axis 1302) that the current input value will occur based on historical data 252 against the degree of influence (x-axis 1304) of the input on the KPI value. A size of the bubbles representing data points 1306a-1306d indicates variability of the input variable. By way of example only and not by way of limitation, data points 1306a-1306d comprising the most influencing inputs are determined by the degree of the influence of the input variable on the KPI value, the standard deviation of the input variable, and the likelihood the current input value will be the actual input value.

Continuing with the illustrated example, data points 1306a-1306d comprise four data points represented by a large bubble 1306c, a smaller bubble 1306d, and the two smallest bubbles 1306a-1306b. Large bubble 1306c represents the input variable of MaxCycle and, by its size, indicates that this input variable has a wide range of input values, while its location indicates a high likelihood of having the current value. Small bubble 1306d represents an input having a higher impact on the predicted KPI if the actual input value is not the same as the current input value, while the two smallest bubbles 1306a-1306d indicate these inputs will have less impact on the predicted KPI value if the actual input values are not the same as the current value.

In this example, impact influence visualization 610 indicates that for the selected KPI (network profit), the input variable of MaxCycle represented large bubble 1306c has the greatest influence on the predicted value of network profit, indicated by its calculated high degree of influence (x-axis 1304). The second most influencing input variable is Fixed Costs represented by smaller bubble 1306d, followed by the lead time for the first item and the lead time for the second item represented by smallest bubbles 1306a-1306b.

Based on the identification of the input variable having the greatest influence on the predicted KPI value, the planner may modify the value of the input variable to determine if the risk may be decreased. As disclosed above, risk management visualization system 110 provides an interactive element of the GUI to receive an input to modify the input variable value. For example, risk management dashboard 600 of the current example comprises input value entry boxes 908a-908d. According to one embodiment, risk management visualization system 110 sets the initial value displayed in the input value entry boxes to the value that provides the best KPI value.

According to embodiments, risk management visualization system 110 calculates degree of influence, likelihood of the optimal value, and the variability of the input variable according to the following description.

Degree of Influence

For a selected KPI and for each input variable, risk management visualization system 110 calculates the degree of influence as the derivative of the predicted KPI value at the optimal input value for a feasible input range. This derivative is calculated by:

1. When the optimal input value is equal to the first value in the input values range, then the derivative is equal to the predicted KPI values at the first k % after the optimal value minus the predicted KPI values at the optimal value;

2. When the optimal input is equal to the last value in input values range, then the derivative is equal to the predicted KPI values [−1]-predicted KPI values [−2] wherein, [−1] indicates the predicted KPI value for the last input value from the range (here, the KPI value at input=20, for the input range 0 to 20) and [−2] represents a second to last KPI value; or 3. When the optimal input is not equal to the first value or the last value of the input values range, then the derivative is equal to the predicted KPI values at the first k % after the optimal value minus the predicted KPI values at the optimal value.

Likelihood of the Optimal Value

Risk management visualization system 110 calculates the likelihood at the current input value by calculating the difference of the cumulative distribution function from the Gaussian of e input mean and the input σ at the optimal input value and the first k % after the optimal input.

Variability of the Input Variable

Risk management visualization system 110 calculates the radius of a bubble representing a data point 1306a-1306d as the sum of the input σ divided by the length of the input σ.

In addition, or as an alternative, risk management visualization system 110 calculates the degree of influence, the likelihood of the value, and/or the variability of the input variable from an optimal value of the input variable, a current value of the input variable, or any other value of the input variable, according to particular needs.

Predicted Impact on KPIs

FIG. 14 illustrates KPI impact visualization 612, according to an embodiment. KPI impact visualization 612 comprises KPI values of current run 1402a and previous run 1402b for each of the four KPIs (network profit 1404a, overhead cost 1404b, transportation cost 1404c, and transit inv. cost 1404d). KPI values for current run 1402a represent the calculated predicted KPI values for a current scenario (such as, for example, the scenario run after changing the risk range or input value. The predicted KPI values of previous run 1402b are the calculated predicted KPI values for the previous scenario (such as, for example, prior to changing the input values).

Risk management visualization 500 may update KPI impact visualization 612 to display KPI values for current run 1402a and previous run 1404b to indicate whether a modified input may lead to an increase, decrease, or no change in the objective value for the various KPIs 1404a-1404d. Continuing with the previous example where the Fixed Cost input was modified at input distribution visualization 606a, network profit KPI 1404a of current run 1402a is 1,044,910, whereas the value for previous run 1402b is 1,041,310. The network profit KPI 1404a value is greater for current run 1402a, which indicates an improvement by modifying the fixed cost input. In addition, overhead cost KPI 1404b and transportation cost KPI 1404c have decreased, which indicates these KPIs have improved as well.

Although risk management dashboard 600 is shown and described as comprising a single KPI risk chart 602, a single risk range selector 604, four input distribution charts 606a-606d, four KPI distribution charts 608a-608d, a single input impact visualizations 510, a single KPI impact visualization 612, four input recommendation visualizations 614a-614d, a single risk analysis selector 616, and a single replan button 618, embodiments contemplate any suitable combination any number of these and other visualizations and interactive elements, according to particular needs.

By way of further explanation only and not by way of limitation, an example of risk management dashboard 600 is described in connection with a strategic network design planning model, for four inputs: Fixed Costs, MaxCycle, lead time for Item 1, and lead time for Item 2. In the following example, the data illustrated on risk management dashboard 600 will be altered to show some examples of different configurations and changes to input values.

Figure 15A:
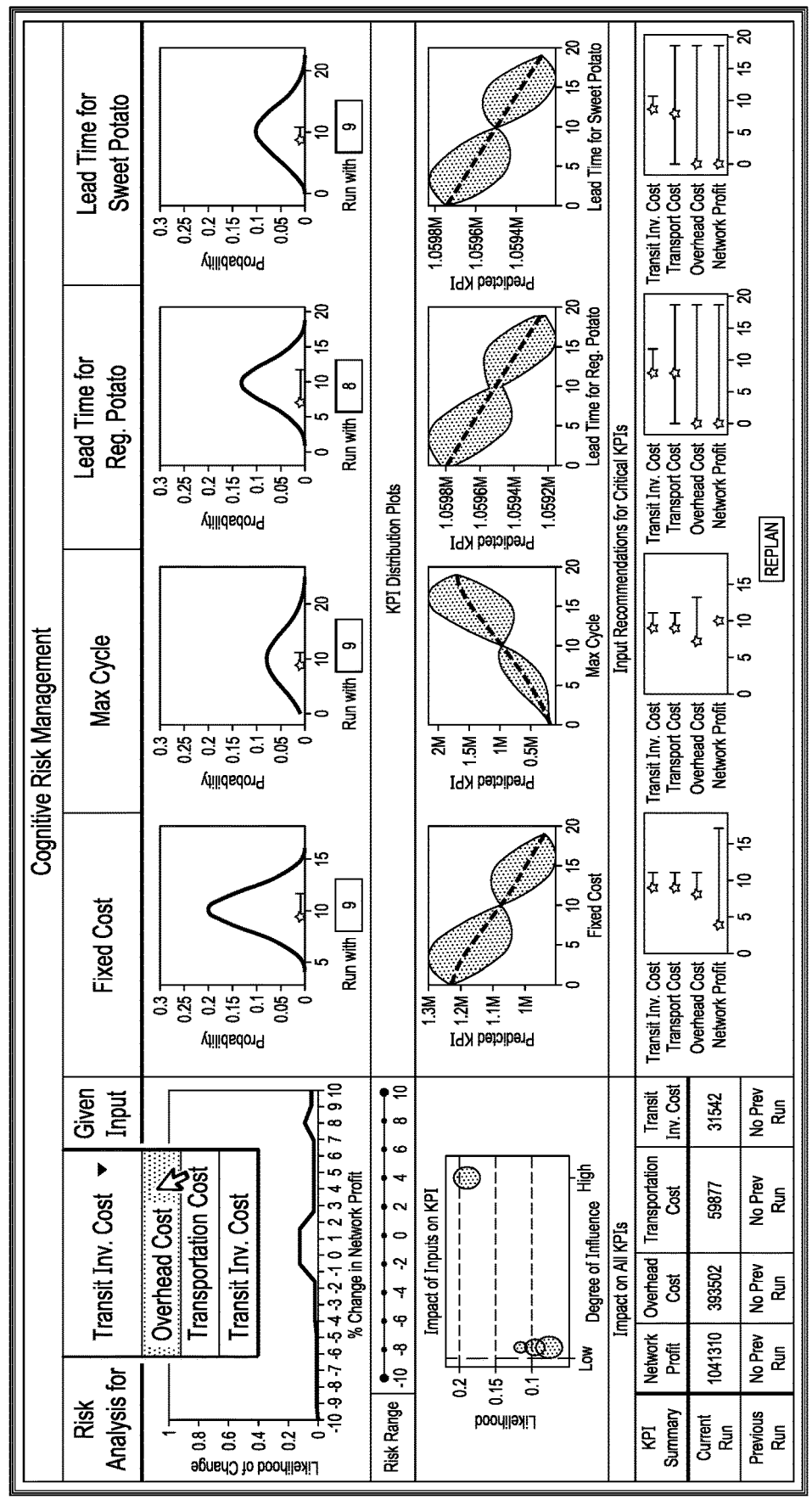
FIGS. 15A-15C illustrate risk management dashboard for various KPIs, according to embodiments.

FIG. 15A illustrates risk management dashboard 600 for a transit inv. cost KPI, according to an embodiment. Risk management system 110 updates risk management dashboard 600 in response to selection of the transit inv. cost KPI by risk analysis selector 616. In one embodiment, risk management dashboard 600 initially displays the KPI having the greatest risk. However, risk management dashboard 600 provides for selecting one or more different KPIs, which updates risk management dashboard 600 to display visualizations reflecting the risk of the selected KPI as well as the influence, variability, range of feasible values, and optimal values of the input variables. In one embodiment, risk analysis selector 616 provides for selecting a different KPI, such as, for example, overhead cost, transportation cost, and transit inv. costs. In response to selection of a different KPI, risk management visualization system 110 automatically updates the visualizations of risk management dashboard 600 to show the data for the selected KPI.

Figure 15B:
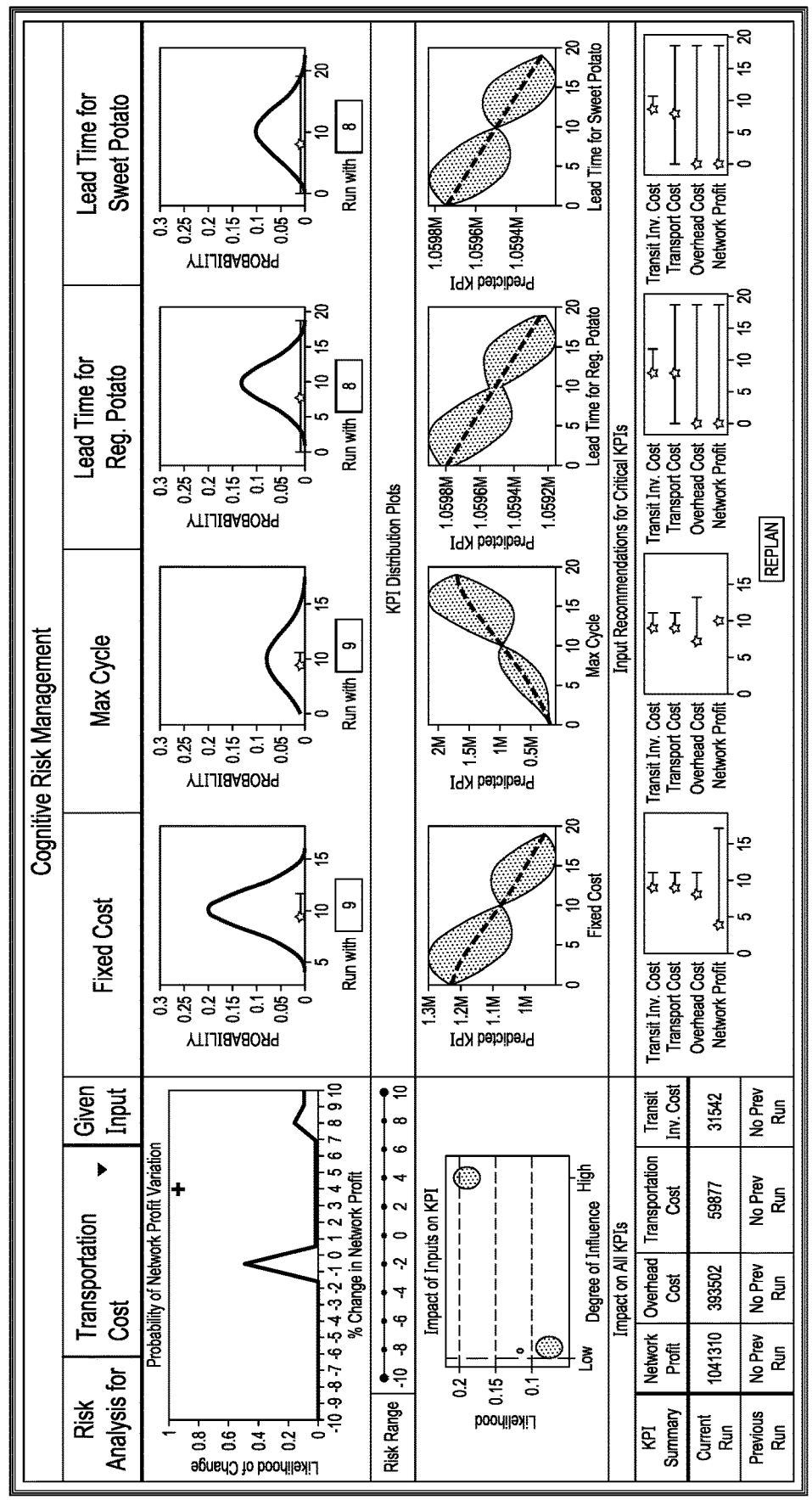

FIG. 15B illustrates risk management dashboard 600 for a network profit KPI, according to an embodiment. When network profit is selected from risk analysis selector 616, risk management system 110 updates management dashboard 600 to display the distribution curve of predicted KPI values of the effect of the range of input variables on the predicted values of the KPIs for the newly-selected KPI. In addition, the degree of influence chart is updated to display the influence of the input variables on the newly-selected KPI, and the optimal values of the input variables may be adjusted to maximize the current KPI or minimize the risk of the currently-selected KPI. Although the input value is initially selected as the optimal input value, the input value is editable, as disclosed above.

Figure 15C:
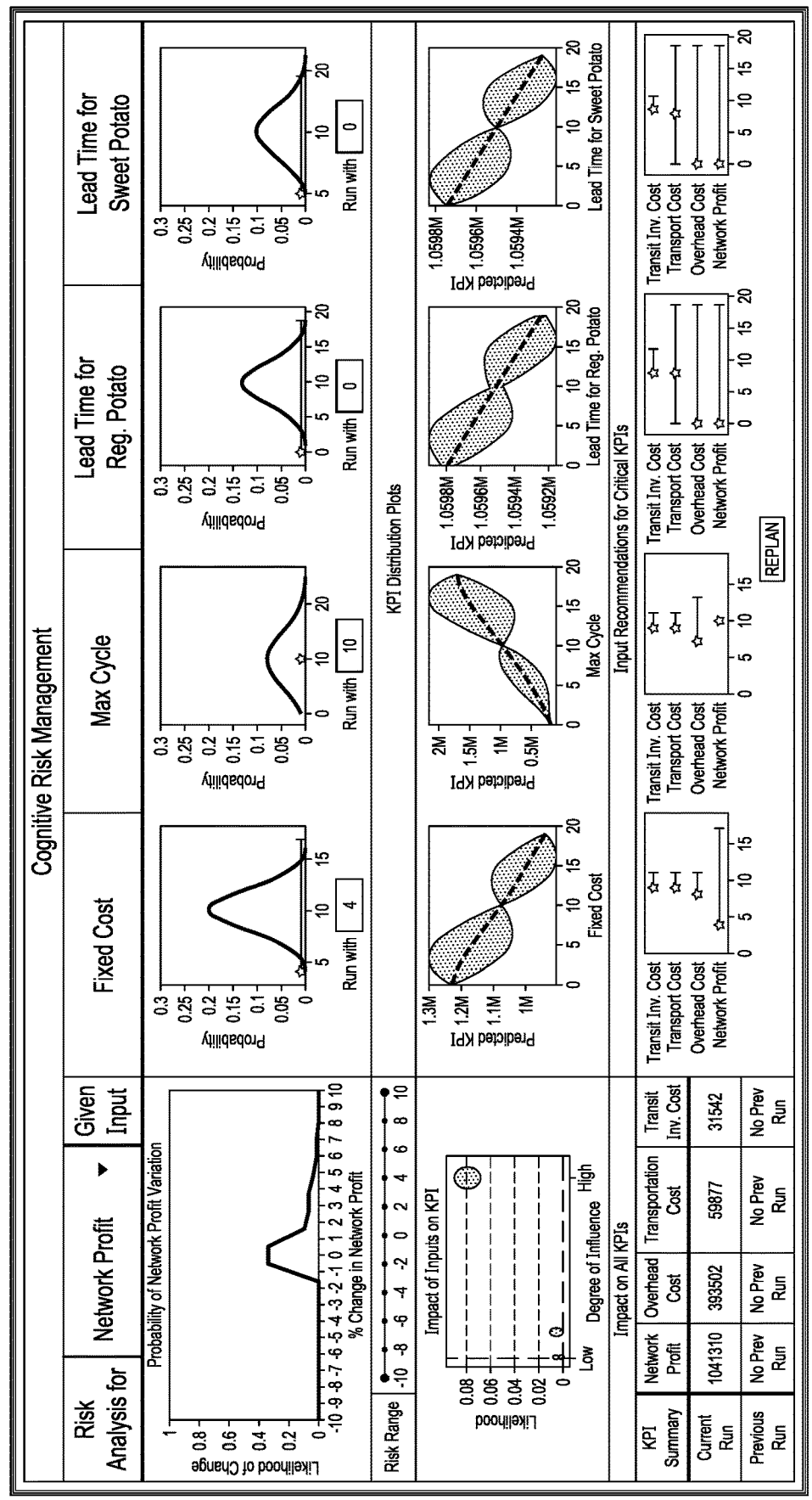

FIG. 15C illustrates risk management dashboard 600 for a transportation cost KPI, according to an embodiment. In response to selection of transportation cost KPI from risk analysis selector 616, risk management system 110 updates risk management dashboard 600 in response to selection of the transportation cost KPI.

Figure 16:
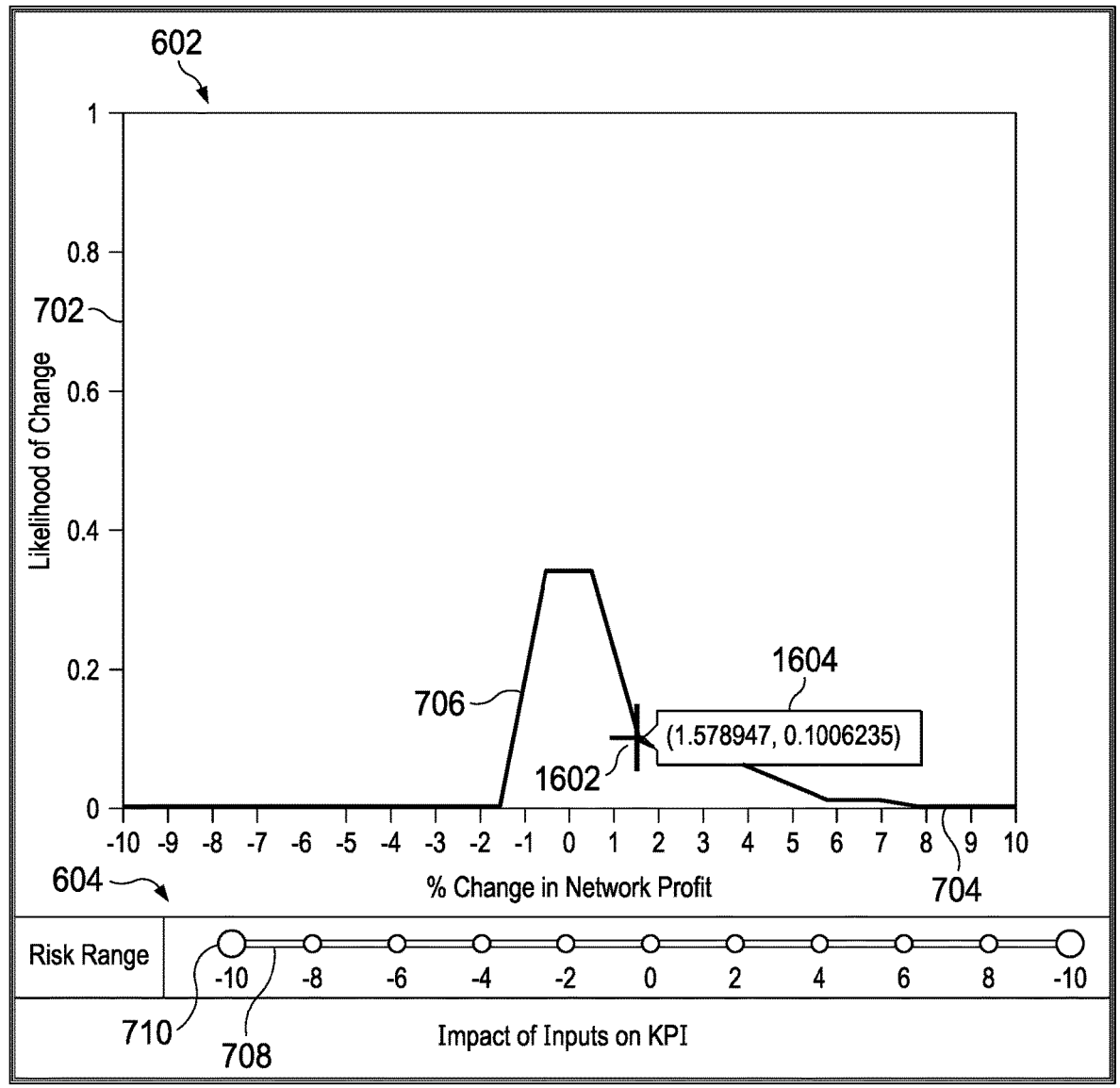
FIG. 16 illustrates data point selection of KPI risk chart, according to an embodiment.

FIG. 16 illustrates data point selection of KPI risk chart 602, according to an embodiment. In response to receiving input from input device 172, cursor 1602 moves along curve 706 indicating data point 1604 of KPI risk chart 602. By way of example only and not by way of limitation, cursor 1602 selects data point 1604 of (1.578947, 0.1006235), which indicates a 10% risk of an increase of 1.57% in the KPI. Curve 706 displayed on KPI risk chart 602 indicates the actual network profit may range from approximately 1.5% less to 9% more than the current predicted KPI value. Although the chart indicates the likelihood of network profit being greater than the current value is greater than the likelihood of being less than the current value, risk management dashboard 600 provides tools that may further reduce this uncertainty. Risk management visualization system 110 identifies the input variable that has the greatest influence on the risk profile, which, as disclosed above, for the illustrated example is the MaxCycle input, as shown by input influence visualization 610.

Figure 17:
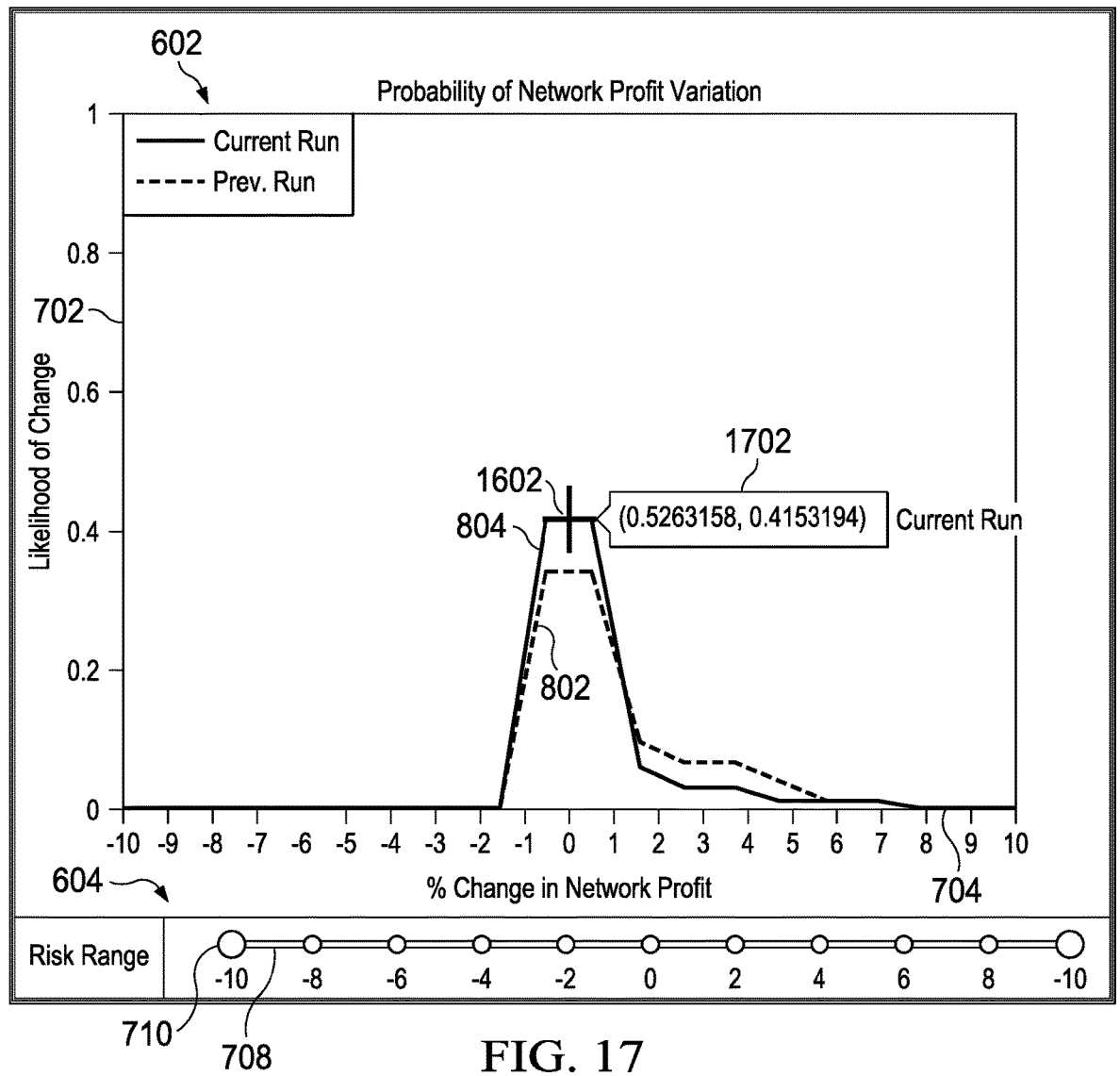
FIG. 17 illustrates a KPI risk chart for current and previous runs after modifying a Fixed Cost input value, according to an embodiment.

FIG. 17 illustrates KPI risk chart 602 for the current and previous runs after modifying the Fixed Cost input value, according to an embodiment. In response to modifying the Fixed Cost input value, risk management visualization system 110 updates the risk profile including KPI risk chart 602. In this example, the updated risk profile indicates the risk is reduced by a small amount, which is shown by the height of curve 802 for the current run, which as disclosed above, indicates the probability of the percentage increase or decrease. Continuing with this example, cursor 1602 indicates the data point 1702 showing that the probability of a 1.5% increase in the KPI is approximately 6.4% for the current run, whereas, at the previous run shown by curve 804 the probability of a 1.5% increase was approximately 10%. KPI risk chart 602 indicates that the risk of an increase over the predicted value has been reduced by approximately 3.6%.

Risk management visualization system 110 may now receive input to check other input variable values to see whether further improvements to the risk profile may be made, by making adjustments to input variables, adjusting the risk range, and checking the impact on the predicted KPI values, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A risk management visualization system, comprising:
   a system architecture having a UI layer, a backend layer, a solvers layer and at least one server;
   the at least one server, each comprising a processor and memory, is configured to:
      request, via a first asynchronous application programming interface call to one or more solvers of the solvers layer, to open a supply chain model of a supply chain network;
      check, via a second application programming interface call from the backend layer at regular intervals to the one or more solvers of the solvers layer, whether the one or more solvers are busy processing any request or are available to handle the request;
      model, using the backend layer, the supply chain network as a supply chain planning problem, wherein one or more key process indicators (KPIs) of the supply chain planning problem are based, at least in part, on one or more input variables, wherein the backend layer uses one or more data update and retrieval Application Programming Interfaces (APIs) to trigger the one or more solvers to fetch data for the modelling;
      model, via an application programming interface call from the backend layer to the solvers layer, an impact on the one or more KPIs from each of the one or more input variables at a selected confidence interval using a Bayesian optimization process; and
      display, using the UI layer, by one or more call back scripts that transmit requests to the solvers layer and by one or more python script modules, a visualization of a risk profile for the one or more KPIs, the visualization indicating a probability that an actual KPI value differs from a predicted KPI value.

2. The risk management visualization system of claim 1, wherein the computer is further configured to:
   receive a risk range selection, the risk range selection indicating a level of acceptable risk associated with the predicted KPI value;
   calculate an optimal value for the one or more input variables and a range of feasible values for the one or more input variables, wherein the feasible values of the one or more input variables generate the predicted KPI value with a risk within the selected risk range; and
   display a visualization of the risk profile with the selected risk range.

3. The risk management visualization system of claim 2, wherein the computer calculates the range of feasible values using a KPI lower bound and KPI upper bound of the selected risk range based on a base KPI value by:
   calculating a standard deviation and a mean of the predicted KPI values; and
   when the standard deviation is non-zero, setting the KPI lower bound and the KPI upper bound equal to a Gaussian interval for the standard deviation, the mean, and the selected confidence interval.

4. The risk management visualization system of claim 1, wherein the computer is further configured to:
   identify sample points for building a surrogate model using an acquisition function; and
   determine the sample points from the acquisition function by calculating input values having high uncertainties and input values having high derivative values.

5. The risk management visualization system of claim 1, wherein the computer is further configured to:
   build a surrogate model by approximating a relationship between each of the one or more input variables and a resulting KPI value, wherein the surrogate model is constructed using the Bayesian optimization process.

6. The risk management visualization system of claim 1, wherein the visualization of the risk profile further comprises a visualization of a likelihood at a current input value, wherein the current input value is calculated as a difference of a cumulative distribution function from a Gaussian interval for a mean and standard deviation at an optimal input value and at a set sequential percentage value from the optimal input value.

7. The risk management visualization system of claim 1, wherein the one or more KPIs comprise one or more of:
   a network profit;
   a transportation cost; and
   an overhead cost.

8. A computer-implemented method of risk management visualization, comprising:
   requesting, via a first asynchronous application programming interface call to one or more solvers of a solvers layer, to open a supply chain model of a supply chain network;
   checking, via a second application programming interface call from the backend layer at regular intervals to the one or more solvers of the solvers layer, whether the one or more solvers are busy processing any request or are available to handle the request;
   modeling, using a backend layer, by at least one server, each comprising a processor and memory, the supply chain network as a supply chain planning problem, one or more key process indicators (KPIs) of the supply chain planning problem are based, at least in part, on the one or more input variables, wherein the backend layer uses one or more data update and retrieval Application Programming Interfaces (APIs) to trigger the one or more solvers to fetch data for the modelling;
   modeling, via an application programming interface call from the backend layer to the solvers layer, by the at least one server, an impact on the one or more KPIs from each of the one or more input variables at a selected confidence interval using a Bayesian optimization process; and displaying, using a UI layer, by one or more call back scripts that transmit requests to the solvers layer and by one or more python script modules, by the at least one server, a visualization of a risk profile for the one or more KPIs, the visualization indicating a probability that an actual KPI value differs from a predicted KPI value.

9. The computer-implemented method of claim 8, further comprising:
receiving, by the computer, a risk range selection, the risk range selection indicating a level of acceptable risk associated with the predicted KPI value;
calculating, by the computer, an optimal value for the one or more input variables and a range of feasible values for the one or more input variables, wherein the feasible values of the one or more input variables generate the predicted KPI value with a risk within the selected risk range; and
displaying, by the computer, a visualization of the risk profile with the selected risk range.

10. The computer-implemented method of claim 8, further comprising:
identifying, by the computer, sample points for building a surrogate model using an acquisition function; and
determining, by the computer, the sample points from the acquisition function by calculating input values having high uncertainties and input values having high derivative values.

11. The computer-implemented method of claim 8, further comprising:
building, by the computer, a surrogate model by approximating a relationship between each of the one or more input variables and a resulting KPI value, wherein the surrogate model is constructed using the Bayesian optimization process.

12. The computer-implemented method of claim 8, wherein the visualization of the risk profile further comprises a visualization of a likelihood at a current input value, wherein the current input value is calculated as a difference of a cumulative distribution function from a Gaussian interval for a mean and standard deviation at an optimal input value and at a set sequential percentage value from the optimal input value.

13. The computer-implemented method of claim 8, wherein the one or more KPIs comprise one or more of:
a network profit;
a transportation cost; and
an overhead cost.

14. The computer-implemented method of claim 8, wherein calculating the range of feasible values comprises:
calculating, by the computer, a standard deviation and a mean of the predicted KPI value using a KPI lower bound and KPI upper bound of the selected risk range based on a base KPI value; and
when the standard deviation is non-zero, setting, by the computer, the KPI lower bound and the KPI upper bound equal to a Gaussian interval for the standard deviation, the mean, and the selected confidence interval.

15. A non-transitory computer-readable medium embodied with software, the software when executed by at least one server, the at least one server comprising a processor and memory:
requests, via a first asynchronous application programming interface call to one or more solvers of a solvers layer, to open a supply chain model of a supply chain network;
checks, via a second application programming interface call from the backend layer at regular intervals to the one or more solvers of the solvers layer, whether the one or more solvers are busy processing any request or are available to handle the request;
models, using a backend layer, the supply chain network as a supply chain planning problem, one or more key process indicators (KPIs) of the supply chain planning problem are based, at least in part, on the one or more input variables, wherein the backend layer uses one or more data update and retrieval Application Programming Interfaces (APIs) to trigger the one or more solvers to fetch data for the modelling;
models, via an application programming interface call from the backend layer to the solvers layer, an impact on the one or more KPIs from each of the one or more input variables at a selected confidence interval using a Bayesian optimization process; and
displays, using a UI layer, by one or more call back scripts that transmit requests to the solvers layer and by one or more python script modules, a visualization of a risk profile for the one or more KPIs, the visualization indicating a probability that an actual KPI value differs from a predicted KPI value.

16. The non-transitory computer-readable medium of claim 15, the software when executed further:
receives a risk range selection, the risk range selection indicating a level of acceptable risk associated with the predicted KPI value;
calculates an optimal value for the one or more input variables and a range of feasible values for the one or more input variables, wherein the feasible values of the one or more input variables generate the predicted KPI value with a risk within the selected risk range; and
displays a visualization of the risk profile with the selected risk range.

17. The non-transitory computer-readable medium of claim 16, the software when executed further:
calculates a standard deviation and a mean of the predicted KPI value using a KPI lower bound and KPI upper bound of the selected risk range based on a base KPI value; and
when the standard deviation is non-zero, sets the KPI lower bound and the KPI upper bound equal to a Gaussian interval for the standard deviation, the mean, and the selected confidence interval.

18. The non-transitory computer-readable medium of claim 15, the software when executed further:
identifies sample points for building a surrogate model using an acquisition function; and
determines the sample points from the acquisition function by calculating input values having high uncertainties and input values having high derivative values.

19. The non-transitory computer-readable medium of claim 15, the software when executed further:
builds a surrogate model by approximating a relationship between each of the one or more input variables and a resulting KPI value, wherein the surrogate model is constructed using the Bayesian optimization process.

20. The non-transitory computer-readable medium of claim 15, wherein the visualization of the risk profile further comprises a visualization of a likelihood at a current input value, wherein the current input value is calculated as a difference of a cumulative distribution function from a Gaussian interval for a mean and standard deviation at an optimal input value and at a set sequential percentage value from the optimal input value.

* * * * *